US008693494B2

(12) United States Patent  
Fiatal

(10) Patent No.: US 8,693,494 B2  
(45) Date of Patent: Apr. 8, 2014

(54) POLLING

(75) Inventor: Trevor Fiatal, Redwood City, CA (US)

(73) Assignee: Seven Networks, Inc., Redwood City, CA (US)

(*) Notice: Subject to any disclaimer, the term of this patent is extended or adjusted under 35 U.S.C. 154(b) by 228 days.

(21) Appl. No.: 12/080,247

(22) Filed: Mar. 31, 2008

(65) Prior Publication Data  
US 2008/0298386 A1 Dec. 4, 2008

Related U.S. Application Data

(60) Provisional application No. 60/941,632, filed on Jun. 1, 2007.

(51) Int. Cl.  
H04L 12/403 (2006.01)

(52) U.S. Cl.  
USPC ........... 370/449; 709/203; 709/227; 709/230; 726/3; 726/17; 726/27

(58) Field of Classification Search  
USPC .................. 709/203, 227, 230; 726/3, 17, 27; 370/449  
See application file for complete search history.

(56) References Cited

U.S. PATENT DOCUMENTS

| 222,458 | A | 12/1879 | Connolly et al. |
|---|---|---|---|
| 447,918 | A | 3/1891 | Strowger |
| 4,200,770 | A | 4/1980 | Hellman et al. |
| 4,255,796 | A | 3/1981 | Gabbe et al. |
| 4,276,597 | A | 6/1981 | Dissly et al. |
| 4,531,020 | A | 7/1985 | Wechselberger et al. |
| 4,807,182 | A | 2/1989 | Queen |
| 4,831,582 | A | 5/1989 | Miller et al. |
| 4,875,159 | A | 10/1989 | Cary et al. |
| 4,897,781 | A | 1/1990 | Chang et al. |
| 4,972,457 | A | 11/1990 | O'Sullivan |
| 5,008,853 | A | 4/1991 | Bly et al. |
| 5,159,624 | A | 10/1992 | Makita |
| 5,220,657 | A | 6/1993 | Bly et al. |
| 5,263,157 | A | 11/1993 | Janis |

(Continued)

FOREIGN PATENT DOCUMENTS

| EP | 0772327 A2 | 5/1997 |
|---|---|---|
| EP | 0993165 A2 | 4/2000 |

(Continued)

OTHER PUBLICATIONS

Allchin, James Edward, "An Architecture for Reliable Decentralized Systems," Ph.D. Thesis, Georgia Institute of Technology, 185 pages, Sep. 1983.

(Continued)

Primary Examiner — Kibrom T Hailu  
(74) Attorney, Agent, or Firm — Perkins Coie LLP

(57) ABSTRACT

A system for mobile device poll creation and conductance disclosed. A poll is created using poll creation software on a mobile device, personal computer or a web-based application. A polling server then validates the poll and publishes the poll to one or more mobile devices. The users of the one or mobile devices may then respond to the poll via their mobile device, a personal computer, or a web-based application. The results are sent to the polling server and are processed. The results of the poll are then published to the poll creator and the poll participants.

36 Claims, 3 Drawing Sheets

(56) References Cited

U.S. PATENT DOCUMENTS

| | | |
|---|---|---|
| 5,283,856 A | 2/1994 | Gross et al. |
| 5,357,431 A | 10/1994 | Nakada et al. |
| 5,384,892 A | 1/1995 | Strong |
| 5,386,564 A | 1/1995 | Shearer et al. |
| 5,392,390 A | 2/1995 | Crozier |
| 5,434,994 A | 7/1995 | Shaheen et al. |
| 5,436,960 A | 7/1995 | Campana, Jr. et al. |
| 5,438,611 A | 8/1995 | Campana, Jr. et al. |
| 5,479,472 A | 12/1995 | Campana, Jr. et al. |
| 5,487,100 A | 1/1996 | Kane |
| 5,491,703 A | 2/1996 | Barnaby et al. |
| 5,493,692 A | 2/1996 | Theimer et al. |
| 5,519,606 A | 5/1996 | Frid-Nielsen et al. |
| 5,537,464 A * | 7/1996 | Lewis et al. .............. 379/114.25 |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostresti et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,087 A | 11/1998 | Herz et al. |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,940,813 A | 8/1999 | Hutchings |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,197 A | 12/1999 | d'Eon et al. |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |

(56) References Cited

U.S. PATENT DOCUMENTS

| | | |
|---|---|---|
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,044,372 A | 3/2000 | Rothfus et al. |
| 6,044,381 A | 3/2000 | Boothby et al. |
| 6,047,051 A | 4/2000 | Ginzboorg et al. |
| 6,047,327 A | 4/2000 | Tso et al. |
| 6,052,563 A | 4/2000 | Macko |
| 6,052,735 A | 4/2000 | Ulrich et al. |
| 6,057,855 A | 5/2000 | Barkans |
| 6,065,055 A | 5/2000 | Hughes et al. |
| 6,073,138 A | 6/2000 | de l'Etraz et al. |
| 6,073,142 A | 6/2000 | Geiger et al. |
| 6,073,165 A | 6/2000 | Narasimhan et al. |
| 6,085,166 A | 7/2000 | Beckhardt et al. |
| 6,085,192 A | 7/2000 | Mendez et al. |
| 6,088,677 A | 7/2000 | Spurgeon |
| 6,101,320 A | 8/2000 | Schuetze et al. |
| 6,101,480 A | 8/2000 | Conmy et al. |
| 6,101,531 A | 8/2000 | Eggleston et al. |
| 6,112,181 A | 8/2000 | Shear et al. |
| 6,119,014 A | 9/2000 | Alperovich et al. |
| 6,119,171 A | 9/2000 | Alkhatib |
| 6,125,369 A | 9/2000 | Wu et al. |
| 6,125,388 A | 9/2000 | Reisman |
| 6,128,627 A | 10/2000 | Mattis et al. |
| 6,130,898 A | 10/2000 | Kostreski et al. |
| 6,131,096 A | 10/2000 | Ng et al. |
| 6,131,116 A | 10/2000 | Riggins et al. |
| 6,134,432 A | 10/2000 | Holmes et al. |
| 6,138,013 A | 10/2000 | Blanchard et al. |
| 6,138,124 A | 10/2000 | Beckhardt |
| 6,138,128 A | 10/2000 | Perkowitz et al. |
| 6,138,146 A | 10/2000 | Moon et al. |
| 6,141,664 A | 10/2000 | Boothby |
| 6,151,606 A | 11/2000 | Mendez |
| 6,157,630 A | 12/2000 | Adler et al. |
| 6,161,140 A | 12/2000 | Moriya |
| 6,167,379 A | 12/2000 | Dean et al. |
| 6,167,435 A | 12/2000 | Druckenmiller et al. |
| 6,170,014 B1 | 1/2001 | Darago et al. |
| 6,173,312 B1 | 1/2001 | Atarashi et al. |
| 6,173,446 B1 | 1/2001 | Khan et al. |
| 6,175,831 B1 | 1/2001 | Weinreich et al. |
| 6,178,419 B1 | 1/2001 | Legh-Smith et al. |
| 6,181,935 B1 | 1/2001 | Gossman et al. |
| 6,185,184 B1 | 2/2001 | Mattaway et al. |
| 6,195,533 B1 | 2/2001 | Tkatch et al. |
| 6,198,696 B1 | 3/2001 | Korpi et al. |
| 6,198,922 B1 | 3/2001 | Baynham |
| 6,201,469 B1 | 3/2001 | Balch et al. |
| 6,202,085 B1 | 3/2001 | Benson et al. |
| 6,205,448 B1 | 3/2001 | Kruglikov et al. |
| 6,212,529 B1 | 4/2001 | Boothby et al. |
| 6,219,694 B1 | 4/2001 | Lazaridis et al. |
| 6,221,877 B1 | 4/2001 | Aronov et al. |
| 6,223,187 B1 | 4/2001 | Boothby et al. |
| 6,226,686 B1 | 5/2001 | Rothschild et al. |
| 6,233,341 B1 | 5/2001 | Riggins |
| 6,243,705 B1 | 6/2001 | Kucala |
| 6,246,875 B1 | 6/2001 | Seazholtz et al. |
| 6,247,135 B1 | 6/2001 | Feague |
| 6,249,808 B1 | 6/2001 | Seshadri |
| 6,256,666 B1 | 7/2001 | Singhal |
| 6,263,201 B1 | 7/2001 | Hashimoto et al. |
| 6,263,340 B1 | 7/2001 | Green |
| 6,269,369 B1 | 7/2001 | Robertson |
| 6,272,545 B1 | 8/2001 | Flanagin et al. |
| 6,275,850 B1 | 8/2001 | Beyda et al. |
| 6,275,858 B1 | 8/2001 | Bates et al. |
| 6,289,212 B1 | 9/2001 | Stein et al. |
| 6,289,214 B1 | 9/2001 | Backstrom |
| 6,292,904 B1 | 9/2001 | Broomhall et al. |
| 6,295,541 B1 | 9/2001 | Bodnar et al. |
| 6,300,947 B1 | 10/2001 | Kanevsky |
| 6,304,881 B1 | 10/2001 | Halim et al. |
| 6,308,201 B1 | 10/2001 | Pivowar et al. |
| 6,317,594 B1 | 11/2001 | Gossman et al. |
| 6,320,943 B1 | 11/2001 | Borland |
| 6,324,541 B1 | 11/2001 | de l'Etraz et al. |
| 6,324,542 B1 | 11/2001 | Wright, Jr. et al. |
| 6,324,544 B1 | 11/2001 | Alam et al. |
| 6,324,587 B1 | 11/2001 | Trenbeath et al. |
| 6,327,586 B1 | 12/2001 | Kisiel |
| 6,336,117 B1 | 1/2002 | Massarani |
| 6,336,138 B1 | 1/2002 | Caswell et al. |
| 6,351,767 B1 | 2/2002 | Batchelder et al. |
| 6,356,937 B1 | 3/2002 | Montville et al. |
| 6,363,051 B1 | 3/2002 | Eslambolchi et al. |
| 6,363,352 B1 | 3/2002 | Dailey et al. |
| 6,370,566 B2 | 4/2002 | Discolo et al. |
| 6,377,810 B1 | 4/2002 | Geiger et al. |
| 6,380,959 B1 | 4/2002 | Wang et al. |
| 6,389,422 B1 | 5/2002 | Doi et al. |
| 6,389,455 B1 | 5/2002 | Fuisz |
| 6,389,457 B2 | 5/2002 | Lazaridis et al. |
| 6,397,057 B1 | 5/2002 | Malackowski et al. |
| 6,397,230 B1 | 5/2002 | Carmel et al. |
| 6,401,104 B1 | 6/2002 | LaRue et al. |
| 6,401,112 B1 | 6/2002 | Boyer et al. |
| 6,401,113 B2 | 6/2002 | Lazaridis et al. |
| 6,405,197 B2 | 6/2002 | Gilmour |
| 6,411,696 B1 | 6/2002 | Iverson et al. |
| 6,415,031 B1 | 7/2002 | Colligan et al. |
| 6,418,305 B1 | 7/2002 | Neustein |
| 6,418,308 B1 | 7/2002 | Heinonen et al. |
| 6,421,669 B1 | 7/2002 | Gilmour et al. |
| 6,421,781 B1 | 7/2002 | Fox et al. |
| 6,430,602 B1 | 8/2002 | Kay et al. |
| 6,438,585 B2 | 8/2002 | Mousseau et al. |
| 6,438,612 B1 | 8/2002 | Ylonen et al. |
| 6,442,589 B1 | 8/2002 | Takahashi et al. |
| 6,442,637 B1 | 8/2002 | Hawkins et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,487,557 B1 | 11/2002 | Nagatomo |
| 6,487,560 B1 | 11/2002 | LaRue et al. |
| 6,490,353 B1 | 12/2002 | Tan |
| 6,496,802 B1 | 12/2002 | van Zoest et al. |
| 6,499,054 B1 | 12/2002 | Hesselink et al. |
| 6,505,214 B1 | 1/2003 | Sherman et al. |
| 6,516,327 B1 | 2/2003 | Zondervan et al. |
| 6,526,433 B1 | 2/2003 | Chang et al. |
| 6,526,506 B1 | 2/2003 | Lewis |
| 6,529,908 B1 | 3/2003 | Piett et al. |
| 6,532,446 B1 | 3/2003 | King |
| 6,535,892 B1 | 3/2003 | LaRue et al. |
| 6,546,005 B1 | 4/2003 | Berkley et al. |
| 6,549,939 B1 | 4/2003 | Ford et al. |
| 6,556,217 B1 | 4/2003 | Makipaa et al. |
| 6,593,944 B1 | 7/2003 | Nicolas et al. |
| 6,601,026 B2 | 7/2003 | Appelt et al. |
| 6,615,253 B1 | 9/2003 | Bowman-Amuah |
| 6,618,710 B1 | 9/2003 | Zondervan et al. |
| 6,621,892 B1 | 9/2003 | Banister et al. |
| 6,622,157 B1 | 9/2003 | Heddaya et al. |
| 6,625,621 B2 | 9/2003 | Tan et al. |
| 6,636,482 B2 | 10/2003 | Cloonan et al. |
| 6,639,693 B1 | 10/2003 | Ejiri et al. |
| 6,640,097 B2 | 10/2003 | Corrigan et al. |
| 6,640,244 B1 | 10/2003 | Bowman-Amuah |
| 6,640,249 B1 | 10/2003 | Bowman-Amuah |
| 6,643,650 B1 | 11/2003 | Slaughter et al. |
| 6,643,688 B1 | 11/2003 | Fuisz |
| 6,647,384 B1 | 11/2003 | Gilmour |
| 6,650,890 B1 | 11/2003 | Irlam et al. |
| 6,662,016 B1 | 12/2003 | Buckham et al. |
| 6,668,046 B1 | 12/2003 | Albal |
| 6,671,695 B2 | 12/2003 | McFadden |
| 6,671,700 B1 | 12/2003 | Creemer et al. |
| 6,671,702 B2 | 12/2003 | Kruglikov et al. |
| 6,671,757 B1 | 12/2003 | Multer et al. |

(56) References Cited

U.S. PATENT DOCUMENTS

| | | |
|---|---|---|
| 6,694,336 B1 | 2/2004 | Multer et al. |
| 6,697,807 B2 | 2/2004 | McGeachie |
| 6,701,378 B1 | 3/2004 | Gilhuly et al. |
| 6,707,801 B2 | 3/2004 | Hsu |
| 6,708,221 B1 | 3/2004 | Mendez et al. |
| 6,714,965 B2 | 3/2004 | Kakuta et al. |
| 6,721,787 B1 | 4/2004 | Hiscock |
| 6,727,917 B1 | 4/2004 | Chew et al. |
| 6,728,530 B1 | 4/2004 | Heinonen et al. |
| 6,728,786 B2 | 4/2004 | Hawkins et al. |
| 6,732,101 B1 | 5/2004 | Cook |
| 6,732,158 B1 | 5/2004 | Hesselink et al. |
| 6,735,591 B2 | 5/2004 | Khan |
| 6,741,232 B1 | 5/2004 | Siedlikowski et al. |
| 6,741,855 B1 | 5/2004 | Martin et al. |
| 6,742,015 B1 | 5/2004 | Bowman-Amuah |
| 6,742,059 B1 | 5/2004 | Todd et al. |
| 6,745,024 B1 | 6/2004 | DeJaco et al. |
| 6,745,326 B1 | 6/2004 | Wary |
| 6,756,882 B2 | 6/2004 | Benes et al. |
| 6,757,362 B1 | 6/2004 | Cooper et al. |
| 6,757,696 B2 | 6/2004 | Multer et al. |
| 6,757,708 B1 | 6/2004 | Craig et al. |
| 6,760,916 B2 | 7/2004 | Holtz et al. |
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B1 | 12/2004 | Eiden et al. |
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,871,236 B2 | 3/2005 | Fishman et al. |
| 6,873,688 B1 | 3/2005 | Aarnio |
| 6,874,017 B1 | 3/2005 | Inoue et al. |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni et al. |
| 6,965,968 B1 | 11/2005 | Touboul |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,041 B2 | 12/2005 | Araujo et al. |
| 6,981,047 B2 | 12/2005 | Hanson et al. |
| 6,985,933 B1 | 1/2006 | Singhal et al. |
| 6,985,983 B2 | 1/2006 | Pellegrino et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,996,627 B1 | 2/2006 | Carden |
| 6,999,753 B2 | 2/2006 | Beckmann et al. |
| 7,020,685 B1 | 3/2006 | Chen et al. |
| 7,024,491 B1 | 4/2006 | Hanmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,080,371 B1 | 7/2006 | Arnaiz et al. |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,185,362 B2 | 2/2007 | Hawkes et al. |
| 7,194,273 B2 | 3/2007 | Vaudreuil |
| 7,200,390 B1 | 4/2007 | Henager et al. |
| 7,203,733 B1 | 4/2007 | Bern |
| 7,206,806 B2 | 4/2007 | Pineau |
| 7,209,757 B2 | 4/2007 | Naghian et al. |
| 7,210,121 B2 | 4/2007 | Xia et al. |
| 7,219,139 B2 | 5/2007 | Martin et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B1 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,257,639 B1 | 8/2007 | Li et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,260,651 B2 | 8/2007 | Parrella, Sr. et al. |
| 7,272,830 B2 | 9/2007 | de Jong |
| 7,277,408 B2 | 10/2007 | Sorsa |
| 7,284,664 B1 | 10/2007 | Ivchenko et al. |
| 7,289,792 B1 | 10/2007 | Turunen |
| 7,289,964 B1 | 10/2007 | Bowman-Amuah |
| 7,289,971 B1 | 10/2007 | O'Neil et al. |
| 7,293,107 B1 | 11/2007 | Hanson et al. |
| 7,295,853 B2 * | 11/2007 | Jin et al. .................... 455/518 |
| 7,296,155 B1 | 11/2007 | Trostle et al. |
| 7,305,252 B2 | 12/2007 | Britt et al. |
| 7,305,700 B2 | 12/2007 | Boynton et al. |
| 7,310,350 B1 | 12/2007 | Shao et al. |
| 7,310,729 B2 | 12/2007 | Gordon et al. |
| 7,324,473 B2 | 1/2008 | Corneille et al. |
| 7,337,219 B1 | 2/2008 | Meenan et al. |
| 7,349,871 B2 | 3/2008 | Labrou et al. |
| 7,353,274 B1 | 4/2008 | Rouhi et al. |
| 7,359,720 B2 | 4/2008 | Hartmaier et al. |

(56) References Cited

U.S. PATENT DOCUMENTS

| | | | |
|---|---|---|---|
| 7,373,386 B2 | 5/2008 | Gardner et al. | |
| 7,373,661 B2 | 5/2008 | Smith et al. | |
| 7,374,099 B2 | 5/2008 | de Jong | |
| 7,376,701 B2 | 5/2008 | Bhargava et al. | |
| 7,382,879 B1 | 6/2008 | Miller | |
| 7,383,339 B1 | 6/2008 | Meenan et al. | |
| 7,388,950 B2 | 6/2008 | Elsey et al. | |
| 7,389,412 B2 | 6/2008 | Sharma et al. | |
| 7,392,483 B2 | 6/2008 | Wong et al. | |
| 7,395,329 B1 | 7/2008 | Holt et al. | |
| 7,398,271 B1 | 7/2008 | Borkovsky et al. | |
| 7,430,609 B2 | 9/2008 | Brown et al. | |
| 7,441,271 B2 | 10/2008 | Fiatal et al. | |
| 7,443,847 B1 | 10/2008 | Albert et al. | |
| 7,461,071 B2 | 12/2008 | Fitzpatrick et al. | |
| 7,465,231 B2 | 12/2008 | Lewin et al. | |
| 7,469,125 B2 | 12/2008 | Nurmi | |
| 7,472,424 B2 | 12/2008 | Evans et al. | |
| 7,483,036 B2 | 1/2009 | Moore | |
| 7,499,537 B2 | 3/2009 | Elsey et al. | |
| 7,502,615 B2 | 3/2009 | Wilhoite et al. | |
| 7,519,042 B2 | 4/2009 | Gorday et al. | |
| 7,532,571 B1 | 5/2009 | Price et al. | |
| 7,539,665 B2 | 5/2009 | Mendez | |
| 7,548,947 B2 | 6/2009 | Kasriel et al. | |
| 7,548,969 B2 | 6/2009 | Tripp et al. | |
| 7,551,900 B2 | 6/2009 | Kang et al. | |
| 7,567,575 B2 * | 7/2009 | Chen et al. | 370/401 |
| 7,574,208 B2 | 8/2009 | Hanson et al. | |
| 7,575,171 B2 | 8/2009 | Lev | |
| 7,584,294 B2 | 9/2009 | Plamondon | |
| 7,587,482 B2 | 9/2009 | Henderson et al. | |
| 7,587,608 B2 | 9/2009 | Haller et al. | |
| 7,593,714 B2 | 9/2009 | Schultz et al. | |
| 7,596,608 B2 | 9/2009 | Alexander et al. | |
| 7,596,791 B2 | 9/2009 | Wei et al. | |
| 7,613,792 B2 | 11/2009 | Zervas et al. | |
| 7,630,986 B1 | 12/2009 | Herz et al. | |
| 7,634,558 B1 | 12/2009 | Mangal et al. | |
| 7,643,818 B2 | 1/2010 | Backholm et al. | |
| 7,644,166 B2 | 1/2010 | Appelman et al. | |
| 7,647,047 B2 | 1/2010 | Moghaddam et al. | |
| 7,650,416 B2 | 1/2010 | Wu et al. | |
| 7,672,291 B2 | 3/2010 | Wang | |
| 7,672,439 B2 | 3/2010 | Appelman et al. | |
| 7,680,281 B2 | 3/2010 | Fiatal et al. | |
| 7,684,346 B2 | 3/2010 | Valli | |
| 7,689,664 B2 | 3/2010 | Karlberg | |
| 7,693,555 B2 | 4/2010 | Srinivasan et al. | |
| 7,693,944 B2 | 4/2010 | Appelman et al. | |
| 7,694,008 B2 | 4/2010 | Chang et al. | |
| 7,706,781 B2 | 4/2010 | Backholm et al. | |
| 7,707,573 B1 | 4/2010 | Marmaros et al. | |
| 7,752,633 B1 | 7/2010 | Fleming | |
| 7,757,956 B2 | 7/2010 | Koenck et al. | |
| 7,769,395 B2 | 8/2010 | Fiatal et al. | |
| 7,769,400 B2 | 8/2010 | Backholm et al. | |
| 7,769,805 B1 | 8/2010 | Barnes et al. | |
| 7,770,223 B2 | 8/2010 | Shevenell et al. | |
| 7,778,792 B2 | 8/2010 | Huang et al. | |
| 7,783,757 B2 | 8/2010 | Plamondon | |
| 7,796,742 B1 | 9/2010 | Sutaria et al. | |
| 7,797,064 B2 | 9/2010 | Loomis et al. | |
| 7,809,818 B2 | 10/2010 | Plamondon | |
| 7,827,055 B1 | 11/2010 | Snodgrass et al. | |
| 7,827,597 B2 | 11/2010 | Boynton et al. | |
| 7,853,563 B2 | 12/2010 | Alvarado et al. | |
| 7,877,703 B1 | 1/2011 | Fleming | |
| 7,881,745 B1 | 2/2011 | Rao et al. | |
| 7,899,996 B1 | 3/2011 | Levin-Michael | |
| 7,908,656 B1 | 3/2011 | Mu | |
| 7,917,468 B2 | 3/2011 | Ariel et al. | |
| 7,917,505 B2 | 3/2011 | van Gent et al. | |
| 7,921,167 B2 | 4/2011 | Shroff et al. | |
| 7,930,416 B2 | 4/2011 | Miller et al. | |
| 7,933,929 B1 | 4/2011 | McClendon et al. | |
| 7,937,091 B2 | 5/2011 | Roman et al. | |
| 7,970,860 B2 | 6/2011 | Kline et al. | |
| 7,996,487 B2 | 8/2011 | Snyder | |
| 8,005,891 B2 | 8/2011 | Knowles et al. | |
| 8,010,082 B2 | 8/2011 | Sutaria et al. | |
| 8,032,409 B1 | 10/2011 | Mikurak | |
| 8,064,583 B1 | 11/2011 | Sutaria et al. | |
| 8,069,166 B2 | 11/2011 | Alvarado et al. | |
| 8,074,162 B1 | 12/2011 | Cohen | |
| 8,078,158 B2 | 12/2011 | Backholm | |
| 8,107,921 B2 | 1/2012 | Fiatal | |
| 8,116,214 B2 | 2/2012 | Backholm et al. | |
| 8,127,342 B2 | 2/2012 | Boynton et al. | |
| 8,131,763 B2 | 3/2012 | Tuscano et al. | |
| 8,166,164 B1 | 4/2012 | Luna et al. | |
| 8,190,701 B2 | 5/2012 | Luna et al. | |
| 8,194,680 B1 | 6/2012 | Brandwine et al. | |
| 8,204,953 B2 | 6/2012 | Luna et al. | |
| 8,209,709 B2 | 6/2012 | Fleming | |
| 8,239,915 B1 | 8/2012 | Satish et al. | |
| 8,260,852 B1 * | 9/2012 | Cselle | 709/204 |
| 8,291,076 B2 | 10/2012 | Luna et al. | |
| 8,316,098 B2 | 11/2012 | Luna et al. | |
| 8,326,985 B2 | 12/2012 | Luna et al. | |
| 2001/0009025 A1 | 7/2001 | Ahonen | |
| 2001/0010046 A1 | 7/2001 | Muyres et al. | |
| 2001/0013069 A1 | 8/2001 | Shah | |
| 2001/0023414 A1 | 9/2001 | Kumar et al. | |
| 2001/0032254 A1 | 10/2001 | Hawkins | |
| 2001/0034225 A1 | 10/2001 | Gupte et al. | |
| 2001/0034244 A1 | 10/2001 | Calder et al. | |
| 2001/0037453 A1 | 11/2001 | Mitty et al. | |
| 2001/0039191 A1 | 11/2001 | Maierhofer | |
| 2001/0041566 A1 | 11/2001 | Xanthos et al. | |
| 2001/0042009 A1 | 11/2001 | Montague | |
| 2001/0042099 A1 | 11/2001 | Peng | |
| 2001/0043148 A1 | 11/2001 | Stewart | |
| 2001/0052052 A1 | 12/2001 | Peng | |
| 2001/0053687 A1 | 12/2001 | Sivula | |
| 2002/0002478 A1 | 1/2002 | Swart et al. | |
| 2002/0002591 A1 | 1/2002 | Ketola | |
| 2002/0004746 A1 | 1/2002 | Ferber et al. | |
| 2002/0007303 A1 | 1/2002 | Brookler et al. | |
| 2002/0013727 A1 | 1/2002 | Lee | |
| 2002/0019225 A1 | 2/2002 | Miyashita | |
| 2002/0019812 A1 | 2/2002 | Board et al. | |
| 2002/0035556 A1 | 3/2002 | Shah et al. | |
| 2002/0035617 A1 | 3/2002 | Lynch et al. | |
| 2002/0038253 A1 | 3/2002 | Seaman et al. | |
| 2002/0042875 A1 | 4/2002 | Shukla | |
| 2002/0049828 A1 | 4/2002 | Pekarek-Kostka | |
| 2002/0049857 A1 | 4/2002 | Farber et al. | |
| 2002/0053078 A1 | 5/2002 | Holtz et al. | |
| 2002/0055351 A1 | 5/2002 | Elsey et al. | |
| 2002/0059201 A1 | 5/2002 | Work | |
| 2002/0059457 A1 | 5/2002 | Ballard et al. | |
| 2002/0068559 A1 | 6/2002 | Sharma et al. | |
| 2002/0073207 A1 | 6/2002 | Widger et al. | |
| 2002/0077077 A1 | 6/2002 | Rezvani et al. | |
| 2002/0077084 A1 | 6/2002 | Zellner et al. | |
| 2002/0078384 A1 | 6/2002 | Hippelainen | |
| 2002/0087549 A1 | 7/2002 | Mostafa | |
| 2002/0087679 A1 | 7/2002 | Pulley et al. | |
| 2002/0087883 A1 | 7/2002 | Wohlgemuth et al. | |
| 2002/0089542 A1 | 7/2002 | Imamura | |
| 2002/0091921 A1 | 7/2002 | Kunzinger | |
| 2002/0095319 A1 | 7/2002 | Swart et al. | |
| 2002/0095328 A1 | 7/2002 | Swart et al. | |
| 2002/0095391 A1 | 7/2002 | Swart et al. | |
| 2002/0095399 A1 | 7/2002 | Devine et al. | |
| 2002/0098855 A1 | 7/2002 | Hartmaier et al. | |
| 2002/0099613 A1 | 7/2002 | Swart et al. | |
| 2002/0099809 A1 | 7/2002 | Lee | |
| 2002/0101975 A1 | 8/2002 | Tiburtius et al. | |
| 2002/0103934 A1 | 8/2002 | Fishman et al. | |
| 2002/0107944 A1 | 8/2002 | Bai et al. | |
| 2002/0107985 A1 | 8/2002 | Hwang et al. | |
| 2002/0116499 A1 | 8/2002 | Enns et al. | |

(56) References Cited

U.S. PATENT DOCUMENTS

| | | |
|---|---|---|
| 2002/0116501 A1 | 8/2002 | Ho et al. |
| 2002/0120388 A1 | 8/2002 | Bullock |
| 2002/0120766 A1 | 8/2002 | Okajima et al. |
| 2002/0120779 A1 | 8/2002 | Teeple et al. |
| 2002/0126701 A1 | 9/2002 | Requena |
| 2002/0128908 A1 | 9/2002 | Levin et al. |
| 2002/0133504 A1 | 9/2002 | Vlahos et al. |
| 2002/0144109 A1 | 10/2002 | Benantar et al. |
| 2002/0146129 A1 | 10/2002 | Kaplan |
| 2002/0152379 A1 | 10/2002 | Gefwert et al. |
| 2002/0155848 A1 | 10/2002 | Suryanarayana |
| 2002/0156839 A1 | 10/2002 | Peterson et al. |
| 2002/0158908 A1 | 10/2002 | Vaajala et al. |
| 2002/0161587 A1 | 10/2002 | Pitts et al. |
| 2002/0161925 A1 | 10/2002 | Munger et al. |
| 2002/0161928 A1 | 10/2002 | Ndili |
| 2002/0164977 A1 | 11/2002 | Link, II et al. |
| 2002/0167484 A1 * | 11/2002 | Hatanaka et al. ............. 345/156 |
| 2002/0174189 A1 | 11/2002 | Peng |
| 2002/0186848 A1 | 12/2002 | Shaik |
| 2002/0188940 A1 | 12/2002 | Breckner et al. |
| 2002/0193094 A1 | 12/2002 | Lawless et al. |
| 2002/0194209 A1 | 12/2002 | Bolosky et al. |
| 2002/0198027 A1 | 12/2002 | Rydbeck |
| 2003/0005151 A1 | 1/2003 | Ullman et al. |
| 2003/0014491 A1 | 1/2003 | Horvitz et al. |
| 2003/0022662 A1 | 1/2003 | Mittal |
| 2003/0023692 A1 | 1/2003 | Moroo |
| 2003/0023975 A1 | 1/2003 | Schrader et al. |
| 2003/0028430 A1 | 2/2003 | Zimmerman |
| 2003/0028441 A1 | 2/2003 | Barsness et al. |
| 2003/0046433 A1 | 3/2003 | Luzzatti et al. |
| 2003/0046586 A1 | 3/2003 | Bheemarasetti et al. |
| 2003/0046587 A1 | 3/2003 | Bheemarasetti et al. |
| 2003/0050041 A1 | 3/2003 | Wu |
| 2003/0051142 A1 | 3/2003 | Hidalgo et al. |
| 2003/0054810 A1 | 3/2003 | Chen et al. |
| 2003/0056096 A1 | 3/2003 | Albert et al. |
| 2003/0060188 A1 | 3/2003 | Gidron et al. |
| 2003/0063120 A1 | 4/2003 | Wong et al. |
| 2003/0065738 A1 | 4/2003 | Yang et al. |
| 2003/0065739 A1 | 4/2003 | Shnier |
| 2003/0065802 A1 | 4/2003 | Vitikainen et al. |
| 2003/0070061 A1 | 4/2003 | Wong et al. |
| 2003/0072451 A1 | 4/2003 | Pimentel et al. |
| 2003/0078880 A1 | 4/2003 | Alley et al. |
| 2003/0084165 A1 | 5/2003 | Kjellberg et al. |
| 2003/0088629 A1 | 5/2003 | Berkowitz et al. |
| 2003/0093691 A1 | 5/2003 | Simon et al. |
| 2003/0097381 A1 | 5/2003 | Detweiler et al. |
| 2003/0100321 A1 | 5/2003 | Rao et al. |
| 2003/0100326 A1 | 5/2003 | Grube et al. |
| 2003/0117432 A1 | 6/2003 | Kautto-Kiovula et al. |
| 2003/0120685 A1 | 6/2003 | Duncombe et al. |
| 2003/0125023 A1 | 7/2003 | Fishler |
| 2003/0126216 A1 | 7/2003 | Avila et al. |
| 2003/0130984 A1 | 7/2003 | Quinlan et al. |
| 2003/0145038 A1 | 7/2003 | Bin Tariq et al. |
| 2003/0146934 A1 | 8/2003 | Bailey et al. |
| 2003/0153338 A1 | 8/2003 | Herz et al. |
| 2003/0154212 A1 | 8/2003 | Schirmer et al. |
| 2003/0156146 A1 | 8/2003 | Suomela et al. |
| 2003/0157947 A1 | 8/2003 | Fiatal et al. |
| 2003/0169262 A1 | 9/2003 | Lavelle et al. |
| 2003/0177281 A1 | 9/2003 | McQuillan et al. |
| 2003/0182420 A1 | 9/2003 | Jones et al. |
| 2003/0182431 A1 | 9/2003 | Sturniolo et al. |
| 2003/0187984 A1 | 10/2003 | Banavar et al. |
| 2003/0204605 A1 | 10/2003 | Hudson et al. |
| 2003/0208529 A1 | 11/2003 | Pendyala et al. |
| 2003/0208559 A1 | 11/2003 | Velline et al. |
| 2003/0210666 A1 | 11/2003 | Trossen et al. |
| 2003/0211845 A1 | 11/2003 | Lohtia et al. |
| 2003/0217098 A1 | 11/2003 | Bobde et al. |
| 2003/0217142 A1 | 11/2003 | Bobde et al. |
| 2003/0223554 A1 * | 12/2003 | Zhang ........................ 379/93.12 |
| 2003/0227487 A1 | 12/2003 | Hugh |
| 2003/0227745 A1 | 12/2003 | Khoo |
| 2003/0235308 A1 | 12/2003 | Boynton et al. |
| 2003/0236857 A1 | 12/2003 | Takase et al. |
| 2003/0236981 A1 | 12/2003 | Marmigere et al. |
| 2004/0002324 A1 | 1/2004 | Juntunen et al. |
| 2004/0006630 A1 | 1/2004 | Friend et al. |
| 2004/0010590 A1 | 1/2004 | Manzano |
| 2004/0015504 A1 | 1/2004 | Ahad et al. |
| 2004/0024795 A1 | 2/2004 | Hind et al. |
| 2004/0024892 A1 | 2/2004 | Creswell et al. |
| 2004/0027326 A1 | 2/2004 | Hays et al. |
| 2004/0027375 A1 | 2/2004 | Ellis et al. |
| 2004/0027378 A1 | 2/2004 | Hays et al. |
| 2004/0043770 A1 | 3/2004 | Amit et al. |
| 2004/0047356 A1 | 3/2004 | Bauer |
| 2004/0049579 A1 | 3/2004 | Ims et al. |
| 2004/0049599 A1 | 3/2004 | Friend et al. |
| 2004/0051715 A1 | 3/2004 | Brokenshire et al. |
| 2004/0054739 A1 | 3/2004 | Friend et al. |
| 2004/0064445 A1 | 4/2004 | Pfleging et al. |
| 2004/0064488 A1 | 4/2004 | Sinha |
| 2004/0068579 A1 | 4/2004 | Marmigere et al. |
| 2004/0068698 A1 | 4/2004 | Wu et al. |
| 2004/0073476 A1 | 4/2004 | Donahue et al. |
| 2004/0073651 A1 * | 4/2004 | Beaulieu et al. .............. 709/223 |
| 2004/0075675 A1 | 4/2004 | Raivisto et al. |
| 2004/0075695 A1 | 4/2004 | Chew et al. |
| 2004/0078814 A1 | 4/2004 | Allen |
| 2004/0080515 A1 | 4/2004 | Hagiwara |
| 2004/0082346 A1 | 4/2004 | Skytt et al. |
| 2004/0098625 A1 | 5/2004 | Lagadec et al. |
| 2004/0103147 A1 | 5/2004 | Flesher et al. |
| 2004/0107319 A1 | 6/2004 | D'Orto et al. |
| 2004/0110497 A1 | 6/2004 | Little |
| 2004/0120323 A1 | 6/2004 | Viikari et al. |
| 2004/0123095 A1 | 6/2004 | Marshall |
| 2004/0123304 A1 | 6/2004 | Black et al. |
| 2004/0127214 A1 | 7/2004 | Reddy et al. |
| 2004/0128375 A1 | 7/2004 | Rockwell |
| 2004/0133626 A1 | 7/2004 | Herrero et al. |
| 2004/0141011 A1 | 7/2004 | Smethers et al. |
| 2004/0147248 A1 | 7/2004 | Will |
| 2004/0147262 A1 | 7/2004 | Lescuyer et al. |
| 2004/0148375 A1 | 7/2004 | Levett et al. |
| 2004/0151186 A1 | 8/2004 | Akama |
| 2004/0158611 A1 | 8/2004 | Daniell et al. |
| 2004/0167966 A1 | 8/2004 | Lee et al. |
| 2004/0170257 A1 | 9/2004 | Gross et al. |
| 2004/0172481 A1 | 9/2004 | Engstrom |
| 2004/0176128 A1 | 9/2004 | Grabelsky et al. |
| 2004/0177369 A1 | 9/2004 | Akins |
| 2004/0179513 A1 | 9/2004 | Smith et al. |
| 2004/0181550 A1 | 9/2004 | Warsta et al. |
| 2004/0184475 A1 | 9/2004 | Meier |
| 2004/0186902 A1 | 9/2004 | Stewart |
| 2004/0189610 A1 | 9/2004 | Friend |
| 2004/0199497 A1 | 10/2004 | Timmons |
| 2004/0199582 A1 | 10/2004 | Kucharewski et al. |
| 2004/0199663 A1 | 10/2004 | Horvitz et al. |
| 2004/0204085 A1 | 10/2004 | Vargas et al. |
| 2004/0205248 A1 | 10/2004 | Little et al. |
| 2004/0205330 A1 | 10/2004 | Godfrey et al. |
| 2004/0209602 A1 | 10/2004 | Joyce et al. |
| 2004/0210639 A1 | 10/2004 | Ben-Yoseph et al. |
| 2004/0219940 A1 | 11/2004 | Kong et al. |
| 2004/0229609 A1 | 11/2004 | Yamaguchi |
| 2004/0230619 A1 | 11/2004 | Blanco et al. |
| 2004/0233930 A1 | 11/2004 | Colby, Jr. |
| 2004/0236792 A1 | 11/2004 | Celik |
| 2004/0242209 A1 | 12/2004 | Kruis et al. |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0259537 A1 | 12/2004 | Ackley |
| 2004/0260948 A1 | 12/2004 | Miyata et al. |
| 2004/0264396 A1 | 12/2004 | Ginzburg et al. |

(56) References Cited

U.S. PATENT DOCUMENTS

| | | |
|---|---|---|
| 2004/0266364 A1 | 12/2004 | Nguyen et al. |
| 2004/0268148 A1 | 12/2004 | Karjala et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022000 A1 | 1/2005 | Inomata et al. |
| 2005/0022182 A1 | 1/2005 | Mittal |
| 2005/0027591 A9 | 2/2005 | Gailey et al. |
| 2005/0027716 A1 | 2/2005 | Apfel |
| 2005/0027869 A1 | 2/2005 | Johnson |
| 2005/0033657 A1 | 2/2005 | Herrington et al. |
| 2005/0033812 A1 | 2/2005 | McCarthy et al. |
| 2005/0033926 A1 | 2/2005 | Dumont |
| 2005/0037741 A1 | 2/2005 | Gilbert |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041793 A1 | 2/2005 | Fulton et al. |
| 2005/0044144 A1 | 2/2005 | Malik et al. |
| 2005/0055578 A1 | 3/2005 | Wright et al. |
| 2005/0063544 A1 | 3/2005 | Uusitalo et al. |
| 2005/0071489 A1 | 3/2005 | Parupudi et al. |
| 2005/0071674 A1 | 3/2005 | Chou et al. |
| 2005/0073982 A1 | 4/2005 | Corneille et al. |
| 2005/0076136 A1 | 4/2005 | Cho et al. |
| 2005/0076241 A1 | 4/2005 | Appelman |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0101307 A1* | 5/2005 | Brugge et al. ............. 455/414.1 |
| 2005/0102257 A1 | 5/2005 | Onyon et al. |
| 2005/0102328 A1 | 5/2005 | Ring et al. |
| 2005/0102351 A1 | 5/2005 | Jiang et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0120181 A1 | 6/2005 | Arunagirinathan et al. |
| 2005/0122333 A1 | 6/2005 | Sumanaweera et al. |
| 2005/0124332 A1 | 6/2005 | Clark et al. |
| 2005/0125459 A1 | 6/2005 | Sutinen et al. |
| 2005/0138111 A1 | 6/2005 | Aton et al. |
| 2005/0138176 A1 | 6/2005 | Singh et al. |
| 2005/0144219 A1 | 6/2005 | Terada |
| 2005/0147130 A1 | 7/2005 | Hurwitz et al. |
| 2005/0154698 A1 | 7/2005 | Ikezawa et al. |
| 2005/0154796 A1 | 7/2005 | Forsyth |
| 2005/0154836 A1 | 7/2005 | Steely et al. |
| 2005/0155027 A1 | 7/2005 | Wei |
| 2005/0164703 A1 | 7/2005 | Huynh |
| 2005/0164721 A1 | 7/2005 | Eric Yeh et al. |
| 2005/0165909 A1 | 7/2005 | Cromer et al. |
| 2005/0170776 A1 | 8/2005 | Siorpaes |
| 2005/0183143 A1 | 8/2005 | Anderholm et al. |
| 2005/0188038 A1 | 8/2005 | Yabe |
| 2005/0193036 A1 | 9/2005 | Phillips et al. |
| 2005/0193096 A1 | 9/2005 | Yu et al. |
| 2005/0198170 A1 | 9/2005 | LeMay et al. |
| 2005/0203966 A1 | 9/2005 | Labrou et al. |
| 2005/0210104 A1 | 9/2005 | Torvinen |
| 2005/0210125 A1 | 9/2005 | Li |
| 2005/0222891 A1 | 10/2005 | Chan et al. |
| 2005/0228812 A1 | 10/2005 | Hansmann et al. |
| 2005/0232295 A1* | 10/2005 | Young ............................. 370/437 |
| 2005/0234860 A1 | 10/2005 | Roever et al. |
| 2005/0235214 A1 | 10/2005 | Shimizu et al. |
| 2005/0246139 A1 | 11/2005 | Rivenbark et al. |
| 2005/0248526 A1 | 11/2005 | Twerdahl et al. |
| 2005/0251555 A1 | 11/2005 | Little |
| 2005/0254443 A1* | 11/2005 | Campbell et al. ............. 370/310 |
| 2005/0256880 A1 | 11/2005 | Nam Koong et al. |
| 2005/0262220 A1 | 11/2005 | Ecklund et al. |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0012672 A1 | 1/2006 | Schrader et al. |
| 2006/0020525 A1 | 1/2006 | Borelli et al. |
| 2006/0020580 A1 | 1/2006 | Dettinger et al. |
| 2006/0020804 A1 | 1/2006 | Schleifer et al. |
| 2006/0020947 A1 | 1/2006 | Hallamaa et al. |
| 2006/0021023 A1* | 1/2006 | Stewart et al. ................... 726/17 |
| 2006/0022048 A1 | 2/2006 | Johnson |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031114 A1 | 2/2006 | Zommers |
| 2006/0031300 A1 | 2/2006 | Kock et al. |
| 2006/0031365 A1 | 2/2006 | Kay et al. |
| 2006/0031428 A1* | 2/2006 | Wikman ........................ 709/220 |
| 2006/0031785 A1 | 2/2006 | Raciborski |
| 2006/0037071 A1 | 2/2006 | Rao et al. |
| 2006/0046686 A1 | 3/2006 | Hawkins et al. |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0052137 A1 | 3/2006 | Randall et al. |
| 2006/0059495 A1 | 3/2006 | Spector |
| 2006/0063544 A1 | 3/2006 | Zhao et al. |
| 2006/0069686 A1 | 3/2006 | Beyda et al. |
| 2006/0069687 A1 | 3/2006 | Cui et al. |
| 2006/0069715 A1 | 3/2006 | Vayssiere |
| 2006/0069742 A1 | 3/2006 | Segre |
| 2006/0069746 A1 | 3/2006 | Davis et al. |
| 2006/0073810 A1 | 4/2006 | Pyhalammi et al. |
| 2006/0074951 A1 | 4/2006 | Beier et al. |
| 2006/0075028 A1 | 4/2006 | Zager et al. |
| 2006/0084410 A1 | 4/2006 | Sutaria et al. |
| 2006/0085503 A1 | 4/2006 | Stoye et al. |
| 2006/0093026 A1 | 5/2006 | Montojo et al. |
| 2006/0093135 A1 | 5/2006 | Fiatal et al. |
| 2006/0099969 A1 | 5/2006 | Staton et al. |
| 2006/0099970 A1 | 5/2006 | Morgan et al. |
| 2006/0112177 A1 | 5/2006 | Barkley et al. |
| 2006/0123042 A1 | 6/2006 | Xie et al. |
| 2006/0132495 A1 | 6/2006 | Anderson |
| 2006/0141962 A1 | 6/2006 | Forbes et al. |
| 2006/0143464 A1 | 6/2006 | Ananthanarayanan et al. |
| 2006/0149591 A1 | 7/2006 | Hanf et al. |
| 2006/0149843 A1 | 7/2006 | Rhoads et al. |
| 2006/0149970 A1 | 7/2006 | Imazu |
| 2006/0155822 A1 | 7/2006 | Yang et al. |
| 2006/0161621 A1 | 7/2006 | Rosenberg |
| 2006/0165226 A1 | 7/2006 | Ernst et al. |
| 2006/0166663 A1 | 7/2006 | Haehnichen et al. |
| 2006/0167969 A1 | 7/2006 | Andreev et al. |
| 2006/0168043 A1 | 7/2006 | Eisenberger et al. |
| 2006/0168164 A1 | 7/2006 | Lemson et al. |
| 2006/0179410 A1 | 8/2006 | Deeds |
| 2006/0188864 A1 | 8/2006 | Shah |
| 2006/0190428 A1 | 8/2006 | Jung et al. |
| 2006/0190569 A1 | 8/2006 | Neil et al. |
| 2006/0190984 A1 | 8/2006 | Heard et al. |
| 2006/0192014 A1 | 8/2006 | Hamilton et al. |
| 2006/0195570 A1 | 8/2006 | Zellner et al. |
| 2006/0209842 A1 | 9/2006 | Creamer et al. |
| 2006/0212531 A1 | 9/2006 | Kikkawa et al. |
| 2006/0224629 A1 | 10/2006 | Alexander et al. |
| 2006/0230394 A1 | 10/2006 | Forth et al. |
| 2006/0240804 A1 | 10/2006 | Backholm et al. |
| 2006/0240805 A1 | 10/2006 | Backholm et al. |
| 2006/0242137 A1 | 10/2006 | Shah et al. |
| 2006/0242210 A1 | 10/2006 | Ring et al. |
| 2006/0242320 A1* | 10/2006 | Nettle et al. ................... 709/245 |
| 2006/0242607 A1 | 10/2006 | Hudson |
| 2006/0252435 A1* | 11/2006 | Henderson et al. ........... 455/466 |
| 2006/0253456 A1 | 11/2006 | Pacholec et al. |

(56) References Cited

U.S. PATENT DOCUMENTS

| | | | |
|---|---|---|---|
| 2006/0253605 A1 | 11/2006 | Sundarrajan et al. | |
| 2006/0259923 A1* | 11/2006 | Chiu | 725/24 |
| 2006/0265595 A1 | 11/2006 | Scottodiluzio | |
| 2006/0271884 A1 | 11/2006 | Hurst | |
| 2006/0277265 A1 | 12/2006 | Backholm et al. | |
| 2006/0277271 A1 | 12/2006 | Morse et al. | |
| 2006/0294071 A1 | 12/2006 | Weare et al. | |
| 2006/0294223 A1 | 12/2006 | Glasgow et al. | |
| 2006/0294388 A1 | 12/2006 | Abraham et al. | |
| 2007/0005738 A1 | 1/2007 | Alexion-Tiernan et al. | |
| 2007/0006317 A1 | 1/2007 | Asami et al. | |
| 2007/0011367 A1 | 1/2007 | Scott et al. | |
| 2007/0019610 A1 | 1/2007 | Backholm et al. | |
| 2007/0021065 A1 | 1/2007 | Sengupta et al. | |
| 2007/0022118 A1 | 1/2007 | Layne | |
| 2007/0027775 A1 | 2/2007 | Hwang | |
| 2007/0027832 A1 | 2/2007 | Fiatal et al. | |
| 2007/0027886 A1 | 2/2007 | Gent et al. | |
| 2007/0027917 A1 | 2/2007 | Ariel et al. | |
| 2007/0027920 A1 | 2/2007 | Alvarado et al. | |
| 2007/0027921 A1 | 2/2007 | Alvarado et al. | |
| 2007/0027930 A1 | 2/2007 | Alvarado et al. | |
| 2007/0033531 A1 | 2/2007 | Marsh | |
| 2007/0038567 A1 | 2/2007 | Allaire et al. | |
| 2007/0038931 A1 | 2/2007 | Allaire et al. | |
| 2007/0044041 A1* | 2/2007 | Beynon et al. | 715/862 |
| 2007/0049258 A1 | 3/2007 | Thibeault | |
| 2007/0060196 A1 | 3/2007 | Sharma | |
| 2007/0061393 A1 | 3/2007 | Moore | |
| 2007/0067147 A1 | 3/2007 | Huang | |
| 2007/0067381 A1* | 3/2007 | Grant et al. | 709/200 |
| 2007/0067424 A1 | 3/2007 | Raciborski et al. | |
| 2007/0070931 A1 | 3/2007 | Lewis et al. | |
| 2007/0072617 A1 | 3/2007 | Lewis et al. | |
| 2007/0077949 A1 | 4/2007 | Henderson et al. | |
| 2007/0078857 A1* | 4/2007 | Punaganti et al. | 707/10 |
| 2007/0078964 A1 | 4/2007 | East et al. | |
| 2007/0088852 A1 | 4/2007 | Levkovitz | |
| 2007/0105627 A1 | 5/2007 | Campbell | |
| 2007/0111764 A1 | 5/2007 | Park et al. | |
| 2007/0116223 A1 | 5/2007 | Burke et al. | |
| 2007/0118620 A1 | 5/2007 | Cartmell et al. | |
| 2007/0123214 A1 | 5/2007 | Mock | |
| 2007/0130108 A1 | 6/2007 | Simpson et al. | |
| 2007/0130217 A1 | 6/2007 | Linyard et al. | |
| 2007/0140193 A1 | 6/2007 | Dosa et al. | |
| 2007/0147317 A1 | 6/2007 | Smith et al. | |
| 2007/0147411 A1 | 6/2007 | Bijwaard et al. | |
| 2007/0150881 A1 | 6/2007 | Khawand et al. | |
| 2007/0156824 A1 | 7/2007 | Thompson | |
| 2007/0156842 A1 | 7/2007 | Vermeulen et al. | |
| 2007/0162514 A1 | 7/2007 | Civetta et al. | |
| 2007/0167178 A1 | 7/2007 | Al-Harbi | |
| 2007/0174433 A1 | 7/2007 | Mendez et al. | |
| 2007/0175998 A1 | 8/2007 | Lev | |
| 2007/0198698 A1* | 8/2007 | Boyd et al. | 709/224 |
| 2007/0220080 A1 | 9/2007 | Humphrey | |
| 2007/0220099 A1 | 9/2007 | Di Giorgio et al. | |
| 2007/0233855 A1 | 10/2007 | Brown et al. | |
| 2007/0237318 A1* | 10/2007 | McGary | 379/114.15 |
| 2007/0240218 A1 | 10/2007 | Tuvell et al. | |
| 2007/0245010 A1 | 10/2007 | Arn et al. | |
| 2007/0249365 A1 | 10/2007 | Jendbro | |
| 2007/0250591 A1 | 10/2007 | Milic-Frayling et al. | |
| 2007/0254631 A1 | 11/2007 | Spooner | |
| 2007/0255848 A1 | 11/2007 | Sewall et al. | |
| 2007/0264993 A1 | 11/2007 | Hughes | |
| 2007/0267492 A1* | 11/2007 | Maclaine Pont | 235/386 |
| 2007/0276925 A1 | 11/2007 | La Joie et al. | |
| 2007/0276926 A1 | 11/2007 | LaJoie et al. | |
| 2007/0288469 A1 | 12/2007 | Shenfield | |
| 2007/0290787 A1 | 12/2007 | Fiatal et al. | |
| 2007/0293207 A1* | 12/2007 | Guedalia et al. | 455/415 |
| 2007/0293238 A1 | 12/2007 | Fiatal et al. | |
| 2007/0293958 A1 | 12/2007 | Stehle et al. | |
| 2007/0294295 A1 | 12/2007 | Finkelstein et al. | |
| 2007/0294373 A1 | 12/2007 | Harrison | |
| 2007/0294763 A1 | 12/2007 | Udezue et al. | |
| 2007/0296701 A1 | 12/2007 | Pope et al. | |
| 2007/0299918 A1 | 12/2007 | Roberts | |
| 2007/0300273 A1* | 12/2007 | Turner | 725/105 |
| 2008/0001717 A1 | 1/2008 | Fiatal | |
| 2008/0008095 A1 | 1/2008 | Gilfix | |
| 2008/0009344 A1 | 1/2008 | Graham et al. | |
| 2008/0016236 A1 | 1/2008 | Beverly et al. | |
| 2008/0032718 A1 | 2/2008 | Suresh | |
| 2008/0034031 A1 | 2/2008 | Weisbrot et al. | |
| 2008/0037787 A1 | 2/2008 | Boynton et al. | |
| 2008/0059308 A1 | 3/2008 | Gerken | |
| 2008/0059398 A1 | 3/2008 | Tsutsui | |
| 2008/0061142 A1* | 3/2008 | Howcroft et al. | 235/386 |
| 2008/0068519 A1 | 3/2008 | Adler et al. | |
| 2008/0072324 A1 | 3/2008 | Repasi et al. | |
| 2008/0077506 A1 | 3/2008 | Rampell et al. | |
| 2008/0077571 A1 | 3/2008 | Harris et al. | |
| 2008/0085719 A1 | 4/2008 | Kuchibhotla et al. | |
| 2008/0085724 A1 | 4/2008 | Cormier et al. | |
| 2008/0086379 A1 | 4/2008 | Dion et al. | |
| 2008/0091773 A1 | 4/2008 | Hameen-Anttila | |
| 2008/0103877 A1 | 5/2008 | Gerken | |
| 2008/0104666 A1 | 5/2008 | Dillaway | |
| 2008/0108298 A1* | 5/2008 | Selen et al. | 455/2.01 |
| 2008/0114881 A1 | 5/2008 | Lee et al. | |
| 2008/0117922 A1 | 5/2008 | Cockrell et al. | |
| 2008/0125225 A1* | 5/2008 | Lazaridis | 463/41 |
| 2008/0130663 A1* | 6/2008 | Fridman et al. | 370/401 |
| 2008/0133326 A1 | 6/2008 | Goncalves et al. | |
| 2008/0133641 A1 | 6/2008 | Gent et al. | |
| 2008/0133708 A1 | 6/2008 | Alvarado et al. | |
| 2008/0134292 A1 | 6/2008 | Ariel et al. | |
| 2008/0140665 A1 | 6/2008 | Ariel et al. | |
| 2008/0140794 A1 | 6/2008 | Rybak | |
| 2008/0150704 A1 | 6/2008 | Igoe | |
| 2008/0151817 A1 | 6/2008 | Fitchett et al. | |
| 2008/0154870 A1 | 6/2008 | Evermann et al. | |
| 2008/0155613 A1 | 6/2008 | Benya et al. | |
| 2008/0166999 A1 | 7/2008 | Guedalia et al. | |
| 2008/0167019 A1 | 7/2008 | Guedalia et al. | |
| 2008/0168145 A1 | 7/2008 | Wilson | |
| 2008/0178294 A1 | 7/2008 | Hu et al. | |
| 2008/0180228 A1 | 7/2008 | Wakefield et al. | |
| 2008/0183800 A1 | 7/2008 | Herzog et al. | |
| 2008/0192820 A1 | 8/2008 | Brooks et al. | |
| 2008/0198995 A1 | 8/2008 | McGary et al. | |
| 2008/0201362 A1 | 8/2008 | Multer et al. | |
| 2008/0201751 A1 | 8/2008 | Ahmed et al. | |
| 2008/0207182 A1 | 8/2008 | Maharajh et al. | |
| 2008/0209491 A1 | 8/2008 | Hasek | |
| 2008/0214148 A1 | 9/2008 | Ramer et al. | |
| 2008/0216094 A1 | 9/2008 | Anderson et al. | |
| 2008/0220797 A1 | 9/2008 | Meiby et al. | |
| 2008/0221715 A1 | 9/2008 | Krzyzanowski et al. | |
| 2008/0232290 A1 | 9/2008 | Elzur et al. | |
| 2008/0233983 A1 | 9/2008 | Park et al. | |
| 2008/0242370 A1 | 10/2008 | Lando et al. | |
| 2008/0256090 A1 | 10/2008 | Dietterich et al. | |
| 2008/0263170 A1 | 10/2008 | Caron et al. | |
| 2008/0270379 A1 | 10/2008 | Ramakrishna | |
| 2008/0271123 A1 | 10/2008 | Ollis et al. | |
| 2008/0273498 A1 | 11/2008 | Jalil et al. | |
| 2008/0281798 A1 | 11/2008 | Chatterjee et al. | |
| 2008/0288659 A1 | 11/2008 | Hasha et al. | |
| 2008/0299956 A1 | 12/2008 | Bailey et al. | |
| 2008/0301231 A1 | 12/2008 | Mehta et al. | |
| 2008/0301300 A1 | 12/2008 | Toub | |
| 2008/0313282 A1 | 12/2008 | Warila et al. | |
| 2009/0006116 A1 | 1/2009 | Baker et al. | |
| 2009/0010204 A1 | 1/2009 | Pratt, Jr. et al. | |
| 2009/0010259 A1 | 1/2009 | Sirotkin | |
| 2009/0012841 A1 | 1/2009 | Saft et al. | |
| 2009/0016526 A1 | 1/2009 | Fiatal et al. | |
| 2009/0019141 A1 | 1/2009 | Bush et al. | |
| 2009/0019485 A1* | 1/2009 | Ellis et al. | 725/40 |
| 2009/0019532 A1 | 1/2009 | Jacobsen et al. | |

(56) References Cited

U.S. PATENT DOCUMENTS

| | | |
|---|---|---|
| 2009/0024794 A1 | 1/2009 | Iyer et al. |
| 2009/0027222 A1 | 1/2009 | Larsson et al. |
| 2009/0031006 A1 | 1/2009 | Johnson |
| 2009/0049482 A1 | 2/2009 | Auerbach et al. |
| 2009/0052372 A1 | 2/2009 | Durazzo et al. |
| 2009/0054034 A1 | 2/2009 | Backholm et al. |
| 2009/0055353 A1 | 2/2009 | Meema |
| 2009/0059950 A1 | 3/2009 | Gao et al. |
| 2009/0063647 A1 | 3/2009 | Backholm et al. |
| 2009/0075683 A1 | 3/2009 | Backholm et al. |
| 2009/0077263 A1 | 3/2009 | Koganti et al. |
| 2009/0077326 A1 | 3/2009 | Motohashi |
| 2009/0081944 A1 | 3/2009 | Yavuz et al. |
| 2009/0094317 A1 | 4/2009 | Venkitaraman |
| 2009/0100416 A1 | 4/2009 | Brown et al. |
| 2009/0110179 A1 | 4/2009 | Elsey et al. |
| 2009/0119266 A1 | 5/2009 | Fitzpatrick et al. |
| 2009/0125523 A1 | 5/2009 | Fitzpatrick et al. |
| 2009/0144632 A1 | 6/2009 | Mendez |
| 2009/0147008 A1 | 6/2009 | Do et al. |
| 2009/0149203 A1 | 6/2009 | Backholm et al. |
| 2009/0156178 A1 | 6/2009 | Elsey et al. |
| 2009/0157792 A1 | 6/2009 | Fiatal |
| 2009/0164433 A1 | 6/2009 | R. et al. |
| 2009/0164560 A1 | 6/2009 | Fiatal |
| 2009/0172565 A1 | 7/2009 | Jackson et al. |
| 2009/0181641 A1 | 7/2009 | Fiatal |
| 2009/0182500 A1 | 7/2009 | Dicke |
| 2009/0187939 A1 | 7/2009 | Lajoie |
| 2009/0191903 A1 | 7/2009 | Fiatal |
| 2009/0193130 A1 | 7/2009 | Fiatal |
| 2009/0193338 A1 | 7/2009 | Fiatal |
| 2009/0215504 A1 | 8/2009 | Lando |
| 2009/0221326 A1 | 9/2009 | Roussel et al. |
| 2009/0228545 A1 | 9/2009 | Mendez et al. |
| 2009/0241180 A1 | 9/2009 | Fiatal |
| 2009/0248670 A1 | 10/2009 | Fiatal |
| 2009/0248696 A1 | 10/2009 | Rowles et al. |
| 2009/0248794 A1 | 10/2009 | Helms et al. |
| 2009/0248878 A1 | 10/2009 | Tran et al. |
| 2009/0249482 A1 | 10/2009 | Sarathy |
| 2009/0252136 A1 | 10/2009 | Mahany et al. |
| 2009/0254589 A1 | 10/2009 | Nair et al. |
| 2009/0254971 A1 | 10/2009 | Herz et al. |
| 2009/0264138 A1 | 10/2009 | Kang et al. |
| 2009/0282125 A1 | 11/2009 | Jeide et al. |
| 2009/0282130 A1 | 11/2009 | Antoniou et al. |
| 2009/0286531 A1 | 11/2009 | Bhatt et al. |
| 2009/0287750 A1 | 11/2009 | Banavar et al. |
| 2009/0299817 A1 | 12/2009 | Fok et al. |
| 2009/0307133 A1 | 12/2009 | Holloway et al. |
| 2009/0318171 A1 | 12/2009 | Backholm et al. |
| 2009/0323678 A1 | 12/2009 | Wang |
| 2009/0325565 A1 | 12/2009 | Backholm |
| 2009/0327390 A1 | 12/2009 | Tran et al. |
| 2010/0042691 A1 | 2/2010 | Maguire |
| 2010/0049872 A1 | 2/2010 | Roskind |
| 2010/0057924 A1 | 3/2010 | Rauber et al. |
| 2010/0069127 A1 | 3/2010 | Fiennes |
| 2010/0077035 A1 | 3/2010 | Li et al. |
| 2010/0077083 A1 | 3/2010 | Tran et al. |
| 2010/0083255 A1 | 4/2010 | Bane et al. |
| 2010/0087167 A1 | 4/2010 | Tsurutome et al. |
| 2010/0088722 A1 | 4/2010 | Jiang |
| 2010/0093273 A1 | 4/2010 | Hohl |
| 2010/0115050 A1 | 5/2010 | Sultenfuss et al. |
| 2010/0118190 A1 | 5/2010 | Salfati et al. |
| 2010/0131593 A1 | 5/2010 | Kihara et al. |
| 2010/0131617 A1 | 5/2010 | Osborne et al. |
| 2010/0146107 A1 | 6/2010 | Fiatal |
| 2010/0149975 A1 | 6/2010 | Tripathi et al. |
| 2010/0174735 A1 | 7/2010 | Fiatal |
| 2010/0174939 A1 | 7/2010 | Vexler |
| 2010/0186011 A1 | 7/2010 | Magenheimer |
| 2010/0192212 A1 | 7/2010 | Raleigh |
| 2010/0203876 A1 | 8/2010 | Krishnaswamy |
| 2010/0207870 A1 | 8/2010 | Cho |
| 2010/0211651 A1 | 8/2010 | Guedalia et al. |
| 2010/0212010 A1 | 8/2010 | Stringer et al. |
| 2010/0214984 A1 | 8/2010 | Cho et al. |
| 2010/0227594 A1 | 9/2010 | DeVries |
| 2010/0228863 A1 | 9/2010 | Kawauchi |
| 2010/0229096 A1 | 9/2010 | Maiocco et al. |
| 2010/0238915 A1 | 9/2010 | Cayla et al. |
| 2010/0250706 A1 | 9/2010 | Burckart et al. |
| 2010/0250986 A1 | 9/2010 | Black et al. |
| 2010/0251366 A1 | 9/2010 | Baldry |
| 2010/0268757 A1 | 10/2010 | Fisher |
| 2010/0274983 A1 | 10/2010 | Murphy et al. |
| 2010/0279662 A1 | 11/2010 | Kuusinen et al. |
| 2010/0293335 A1 | 11/2010 | Muthiah et al. |
| 2010/0299223 A1 | 11/2010 | Crouch |
| 2010/0313018 A1 | 12/2010 | Jorgensen |
| 2010/0315535 A1 | 12/2010 | Nurit et al. |
| 2010/0319054 A1 | 12/2010 | Mehta et al. |
| 2010/0322124 A1 | 12/2010 | Luoma et al. |
| 2010/0323664 A1 | 12/2010 | Sivaram et al. |
| 2010/0325306 A1 | 12/2010 | Vimpari et al. |
| 2011/0028129 A1 | 2/2011 | Hutchison et al. |
| 2011/0035799 A1 | 2/2011 | Handler |
| 2011/0040718 A1 | 2/2011 | Tendjoukian et al. |
| 2011/0065419 A1 | 3/2011 | Book et al. |
| 2011/0065424 A1 | 3/2011 | Estevez et al. |
| 2011/0066646 A1 | 3/2011 | Danado et al. |
| 2011/0099363 A1 | 4/2011 | Boynton et al. |
| 2011/0113109 A1 | 5/2011 | LeVasseur et al. |
| 2011/0119134 A1 | 5/2011 | Zivkovic et al. |
| 2011/0126060 A1 | 5/2011 | Grube et al. |
| 2011/0138102 A1 | 6/2011 | Glikson et al. |
| 2011/0138402 A1 | 6/2011 | Fleming |
| 2011/0153816 A1 | 6/2011 | Lloyd et al. |
| 2011/0153937 A1 | 6/2011 | Annamalaisami et al. |
| 2011/0158239 A1 | 6/2011 | Mohaban |
| 2011/0165889 A1 | 7/2011 | Fiatal et al. |
| 2011/0177847 A1 | 7/2011 | Huang |
| 2011/0179138 A1 | 7/2011 | Van Geest et al. |
| 2011/0179377 A1 | 7/2011 | Fleming |
| 2011/0182220 A1 | 7/2011 | Black et al. |
| 2011/0184827 A1 | 7/2011 | Hubert |
| 2011/0185355 A1 | 7/2011 | Chawla et al. |
| 2011/0189997 A1 | 8/2011 | Tiwari et al. |
| 2011/0190014 A1 | 8/2011 | Fiatal |
| 2011/0191474 A1 | 8/2011 | Fiatal |
| 2011/0201304 A1 | 8/2011 | Sutaria et al. |
| 2011/0207436 A1 | 8/2011 | Van Gent et al. |
| 2011/0208810 A1 | 8/2011 | Li et al. |
| 2011/0213800 A1 | 9/2011 | Saros et al. |
| 2011/0213898 A1 | 9/2011 | Fiatal et al. |
| 2011/0214182 A1 | 9/2011 | Adams et al. |
| 2011/0238772 A1 | 9/2011 | Fiatal |
| 2011/0246950 A1 | 10/2011 | Luna et al. |
| 2011/0252088 A1 | 10/2011 | Fiatal |
| 2011/0264622 A1 | 10/2011 | Vargas et al. |
| 2011/0264731 A1 | 10/2011 | Knowles et al. |
| 2011/0294463 A1 | 12/2011 | Fiatal |
| 2011/0294464 A1 | 12/2011 | Fiatal |
| 2011/0296050 A1 | 12/2011 | Cherukuri |
| 2011/0296120 A1 | 12/2011 | Khan |
| 2011/0296415 A1 | 12/2011 | Khan et al. |
| 2011/0302154 A1 | 12/2011 | Snyder |
| 2012/0005276 A1 | 1/2012 | Guo et al. |
| 2012/0008536 A1 | 1/2012 | Tervahauta et al. |
| 2012/0022980 A1 | 1/2012 | Angelone |
| 2012/0023190 A1 | 1/2012 | Backholm et al. |
| 2012/0023226 A1 | 1/2012 | Petersen et al. |
| 2012/0023236 A1 | 1/2012 | Backholm et al. |
| 2012/0030280 A1 | 2/2012 | Wang et al. |
| 2012/0030750 A1 | 2/2012 | Bhargava et al. |
| 2012/0054386 A1 | 3/2012 | Hanes |
| 2012/0072910 A1 | 3/2012 | Martin et al. |
| 2012/0077482 A1 | 3/2012 | Backholm |
| 2012/0078725 A1 | 3/2012 | Maitra et al. |
| 2012/0078996 A1 | 3/2012 | Shah |
| 2012/0096092 A1 | 4/2012 | Davidge et al. |

(56) References Cited

U.S. PATENT DOCUMENTS

| | | | |
|---|---|---|---|
| 2012/0108225 A1 | 5/2012 | Luna et al. |
| 2012/0110109 A1 | 5/2012 | Luna et al. |
| 2012/0110110 A1 | 5/2012 | Luna et al. |
| 2012/0110111 A1 | 5/2012 | Luna et al. |
| 2012/0110112 A1 | 5/2012 | Luna et al. |
| 2012/0110118 A1 | 5/2012 | Luna et al. |
| 2012/0110171 A1 | 5/2012 | Luna et al. |
| 2012/0110173 A1 | 5/2012 | Luna et al. |
| 2012/0110174 A1 | 5/2012 | Wootton et al. |
| 2012/0110275 A1 | 5/2012 | Ganti et al. |
| 2012/0130973 A1 | 5/2012 | Tamm et al. |
| 2012/0131095 A1 | 5/2012 | Luna et al. |
| 2012/0131184 A1 | 5/2012 | Luna et al. |
| 2012/0135726 A1 | 5/2012 | Luna et al. |
| 2012/0140750 A1 | 6/2012 | Yan et al. |
| 2012/0149352 A1 | 6/2012 | Backholm et al. |
| 2012/0151044 A1 | 6/2012 | Luna et al. |
| 2012/0157170 A1 | 6/2012 | Backholm et al. |
| 2012/0158837 A1 | 6/2012 | Kaul |
| 2012/0158908 A1 | 6/2012 | Luna et al. |
| 2012/0170496 A1 | 7/2012 | Yang et al. |
| 2012/0170569 A1 | 7/2012 | Al-Khudairi |
| 2012/0173616 A1 | 7/2012 | Luna et al. |
| 2012/0174220 A1 | 7/2012 | Rodriguez |
| 2012/0176968 A1 | 7/2012 | Luna |
| 2012/0178414 A1 | 7/2012 | Fiatal |
| 2012/0179801 A1 | 7/2012 | Luna et al. |
| 2012/0185597 A1 | 7/2012 | Luna |
| 2012/0185918 A1 | 7/2012 | Backholm et al. |
| 2012/0210121 A1 | 8/2012 | Boynton et al. |
| 2012/0226767 A1 | 9/2012 | Luna et al. |
| 2012/0227059 A1 | 9/2012 | Fleming |
| 2012/0246333 A1 | 9/2012 | Fiatal |
| 2012/0254417 A1 | 10/2012 | Luna |
| 2012/0271903 A1 | 10/2012 | Luna |
| 2012/0271908 A1 | 10/2012 | Luna et al. |
| 2012/0278431 A1 | 11/2012 | Luna |
| 2012/0278432 A1 | 11/2012 | Luna |
| 2012/0278886 A1 | 11/2012 | Luna |
| 2012/0284356 A1 | 11/2012 | Luna |
| 2012/0289239 A1 | 11/2012 | Luna et al. |
| 2012/0290675 A1 | 11/2012 | Luna et al. |
| 2012/0290717 A1 | 11/2012 | Luna |

FOREIGN PATENT DOCUMENTS

| | | |
|---|---|---|
| EP | 1278390 A1 | 1/2003 |
| EP | 1422899 A1 | 5/2004 |
| EP | 1466261 A1 | 10/2004 |
| EP | 1466435 A1 | 10/2004 |
| EP | 1482702 A1 | 12/2004 |
| EP | 1815634 A1 | 8/2007 |
| EP | 1815652 A1 | 8/2007 |
| EP | 1817883 A1 | 8/2007 |
| FI | 117152 B1 | 6/2006 |
| FI | 118288 B1 | 9/2007 |
| FI | 119581 B1 | 12/2008 |
| JP | 4154233 A | 5/1992 |
| JP | 10-336372 A | 12/1998 |
| JP | 2001-218185 A | 8/2001 |
| JP | 2001-350718 A | 12/2001 |
| JP | 2001-356973 A | 12/2001 |
| JP | 2005-515664 A | 5/2005 |
| JP | 2009-207177 A | 9/2009 |
| JP | 4386732 | 12/2009 |
| KR | 2001-0018568 A | 3/2001 |
| KR | 2006-0068186 A | 6/2006 |
| KR | 2007-0071858 A1 | 7/2007 |
| KR | 10-0765238 B1 | 10/2007 |
| KR | 2007-0102091 A1 | 10/2007 |
| KR | 2007-0117874 A | 12/2007 |
| KR | 2009-0077515 A | 7/2009 |
| KR | 2010-0064605 A | 6/2010 |
| WO | WO-97/41661 A2 | 11/1997 |
| WO | WO-98/24257 A1 | 6/1998 |
| WO | WO-98/58322 A2 | 12/1998 |
| WO | WO-01/30130 A2 | 5/2001 |
| WO | WO-03/007570 A1 | 1/2003 |
| WO | WO-03/058483 A1 | 7/2003 |
| WO | WO-03/058879 A1 | 7/2003 |
| WO | WO 03/065701 A1 | 8/2003 |
| WO | WO-03/098890 A1 | 11/2003 |
| WO | WO 2004/017591 A2 | 2/2004 |
| WO | WO-2004045171 A1 | 5/2004 |
| WO | WO-2005/015925 A2 | 2/2005 |
| WO | WO-2005/020108 A1 | 3/2005 |
| WO | WO-2006/045005 A2 | 4/2006 |
| WO | WO-2006/045102 A2 | 4/2006 |
| WO | WO-2006/053952 A1 | 5/2006 |
| WO | WO-2006/053954 A1 | 5/2006 |
| WO | WO-2006/058967 A1 | 6/2006 |
| WO | WO-2007/015725 A2 | 2/2007 |
| WO | WO-2007/015726 A1 | 2/2007 |
| WO | WO 2007/127878 A1 | 11/2007 |
| WO | WO-2007/149526 A2 | 12/2007 |
| WO | WO-2007/149540 A2 | 12/2007 |
| WO | WO 2008061042 A2 | 5/2008 |
| WO | WO 2010/068842 A1 | 6/2010 |
| WO | WO 2011/126889 A2 | 10/2011 |
| WO | WO 2012/018430 A1 | 2/2012 |
| WO | WO 2012/018431 A1 | 2/2012 |
| WO | WO 2012/018477 A2 | 2/2012 |
| WO | WO 2012/018479 A2 | 2/2012 |
| WO | WO 2012/018556 A2 | 2/2012 |
| WO | WO 2012/024030 A2 | 2/2012 |
| WO | WO 2012/060995 A2 | 5/2012 |
| WO | WO 2012/060996 A2 | 5/2012 |
| WO | WO 2012/060997 A2 | 5/2012 |
| WO | WO 2012/061430 A2 | 5/2012 |
| WO | WO 2012/061433 A2 | 5/2012 |
| WO | WO 2012/061437 A1 | 5/2012 |
| WO | WO 2012/071283 A1 | 5/2012 |
| WO | WO 2012/071384 A2 | 5/2012 |
| WO | WO 2012/094675 A2 | 7/2012 |
| WO | WO 2012/145533 A2 | 10/2012 |
| WO | WO 2012/145541 A2 | 10/2012 |
| WO | WO 2012/149216 A2 | 11/2012 |
| WO | WO 2012/149434 A2 | 11/2012 |
| WO | WO 2012/161751 A1 | 11/2012 |

OTHER PUBLICATIONS

Augun, Audrey, "Integrating Lotus Notes With Enterprise Data," Lotus Notes Advisory, pp. 22-25, Jul.-Aug. 1996.

Balaban, Bob, "This Is Not Your Father's Basic: LotusScript in Notes Release 4," The View, vol. 1, Issue 5, 32 pages, Nov.-Dec. 1995.

Bedell, Doug, "Meeting Your New Best Friends Six Degrees Widens Your Contacts in Exchange for Sampling Web Sites," The Dallas Morning News, 4 pages, Oct. 27, 1998.

Bergman, Lawrence D. et al., "Programming-By-Demonstration for Behavior-Based User Interface Customization," IBM Research Report, RC23116, 5 pages, Feb. 20, 2004.

B'Far, Reza et al., "Designing Effective User Interfaces for Wireless Devices," Publication Unknown, 14 pages, Published prior to Feb. 23, 2006.

Blaney, Jeff, "You Can Take It With You—An Introduction to Mobile Computing With Notes R4," The View, vol. 2, Issue 1, 14 pages, Jan.-Feb. 1996.

Brown, Kevin et al., "Mastering Lotus Notes®," Sybex Inc., 996 pages, 1995.

"Chapter: About NotesPump," Publication Unknown, 480 pages, Published prior to Jan. 8, 2003.

"Chapter 13-1—Anatomy of a Note ID," Publication Unknown, 8 pages, Published prior to Jan. 8, 2003.

Cole, Barb et al., "Lotus Airs Notes-To-Database Integration Tool," Network World, 2 pages, Oct. 2, 1995.

Dahl, Andrew, "Lotus Notes® 4 Administrator's Survival Guide," Sams Publishing, 64 pages, 1996.

Decker, Stefan et al., "The Social Semantic Desktop," Digital Enterprise Research Institute, DERI Technical Report May 2, 2004, 7 pages, May 2004.

(56) References Cited

OTHER PUBLICATIONS

European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
Falkner, Mike, "How to Plan, Develop, and Implement Lotus Notes® in Your Organization," John Wiley & Sons, Inc., 539 pages, 1996.
Freeland, Pat et al., "Lotus Notes 3-3.1 for Dummies™," IDG Books Worldwide, 389 pages, 1994.
Frenkel, Garry, "Pumping for Info: Notes and Database Integration," Network Computing, 10 pages, May 1, 1996.
Gameline, Advertisement, 1 page, 1982.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.
Haas, Zygmunt J. et al., "Mobile-TCP: an Asymmetric Transport Protocol Design for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hajdu, Kalman et al., "Lotus Notes Release 4 in a Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
ImTOO, "ImTOO iPod Movie Converter," 3 pages, Nov. 9, 2005.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 pages, Feb. 21, 2007.
International Application No. PCT/US2006/023427, International Search Report, 1 pages, Oct. 12, 2006.
International Application No. PCT/US2007/014462, International Search Report, 1 pages, Jul. 2, 2008.
International Application No. PCT/US2007/014497, International Search Report, 1 pages, Aug. 25, 2008.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.

Kleinberg, Jon, "The Small-World Phenomenon: an Algorithmic Perspective," Cornell Computer Science Technical Report 99/1776, 14 pages, Oct. 1999.
Koeppel, Dan, "GUIs Just Want to Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrator's Guide—Server for NetWare, OS-2, and Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.
Lotus Development Corporation, "Lotus Notes Customer Support Guide—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.

(56) References Cited

OTHER PUBLICATIONS

Lotus Development Corporation, "Lotus Notes LotusScript Classes for Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Published prior to Jan. 8, 2003.
Lotus Development Corporation, "Lotus Notes Quick Reference for Macintosh," Release 3, 6 pages, Published prior to Jan. 8, 2003.
Lotus Development Corporation, "Lotus Notes Quick Reference for SmartIcons," Release 3.1, 4 pages, Published prior to Jan. 8, 2003.
Lotus Development Corporation, "Lotus Notes Quick Reference for Windows and Presentation Manager," Release 3, 6 pp., Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—a Beginner's Guide to Lotus Notes," Release 4, 179 pages, 1995.
Lotus Development Corporation, "Lotus Notes Step by Step—a Beginner's Guide to Lotus Notes," Release 4.1, 167 pages, 1996.
Lotus Development Corporation, "Lotus Software Agreement," 8 pages, Published prior to Jan. 8, 2003.
Lotus Development Corporation, "What Is the Notes Replicator?," Lotus Notes Knowledge Base, 8 pages, Jul. 5, 1995.
"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Published prior to Jan. 8, 2003.
MacGregor, Rob et al., "The Domino Defense: Security in Lotus Notes and the Internet," IBM Corporation, 183 pages, Dec. 1997.
Maltz, David A. et al., "MSOCKS: An Architecture for Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin Is in," TechRepublic, 4 pages, Apr. 4, 2001.
McMullen, Melanie, "Network Remote Access and Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves in Cryptography," Advances in Cryptology—CRYPTO '85 Proceedings, vol. 218, pp. 417-426, 1985.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Published prior to Jan. 8, 2003.
Opyt, Barbara et al., "Use the Internet As Your Lotus Notes WAN," Lotus Notes Advisor, pp. 17-20, Nov.-Dec. 1996.
Ortiz, C. Enrique, "An Introduction to the Symbian OS™ Platform for Palm OS® Developers," Metrowerks Corp., 21 pages, 2002.
"Overview—What Is Lotus NotesPump?," Publication Unknown, 88 pages, Published prior to Jan. 8, 2003.
Phillips, Joshua et al., "Modeling the Intelligence Analysis Process for Intelligent User Agent Development," Research and Practice in Human Resource Management, vol. 9, No. 1, pp. 59-73, 2001.
Pyle, Hugh, "The Architecture of Lotus Notes," Lotus Notes Advisor, Premiere Issue, pp. 18-27, 1995.
Pyle, Lisa, "A Jump Start to the Top Ten R3-To-R4 Migration Considerations," The View, vol. 1, Issue 5, 22 pages, Nov.-Dec. 1995.
Ringel, Meredith et al., "iStuff: A Scalable Architecture for Lightweight, Wireless Devices for Ubicomp User Interfaces," Proceedings of UbiComp 2002, 2 pages, 2002.
Shafran, Andrew Bryce, "Easy Lotus Notes® for Windows™," Que Corporation, 199 pages, 1994.
Signorini, Eugene, "SEVEN's Service-Based Wireless Solutions Enable Enterprises to Untether E-Mail," Wireless/Mobile Enterprise & Commerce, 16 pages, Oct. 2004.
Swedeen, Bret et al., "Under the Microscope—Domino Replication," LDD Today, 8 pages, Oct. 1, 1998.
Tamura, Randall A., "Lotus® Notes™ 4 Unleashed," Sams Publishing, 928 pages, 1996.
U.S. Appl. No. 60/663,463, File History, 113 pages, Mar. 18, 2005.
Vivacqua, Adriana et al., "Profiling and Matchmaking Strategies in Support of Opportunistic Collaboration," CoopIS/DOA/ODBASE 2003, LNCS 2888, pp. 162-177, 2003.

(56) References Cited

OTHER PUBLICATIONS

Wainwright, Andrew, "Secrets to Running Lotus Notes: The Decisions No One Tells You How to Make," IBM Corporation, 193 pages, Oct. 1996.
Wilcox, Adam A., "PC Learning Labs Teaches Lotus Notes 3.0," Ziff-Davis Press, 381 pages, 1993.
Wong, Harry, "Casahl's Replic-Action: Delivering True Notes-DBMS Integration," The View, vol. 2, Issue 1, pp. 33-50, Jan.-Feb. 1996.
U.S. Appl. No. 60/346,881, filed Jan. 8, 2002, Method and System for Mobile Data Communications.
U.S. Appl. No. 11/470,802, filed Sep. 7, 2006, Connection Architecture for a Mobile Network.
U.S. Appl. No. 13/101,775, filed May 5, 2011, Mobile Device Power Management in Data Synchronization Over a Mobile Network With or Without a Trigger Notification.
U.S. Appl. No. 60/403,249, filed Aug. 12, 2002, Mobile Data Services.
U.S. Appl. No. 13/396,464, filed Feb. 14, 2012, Secure End-to-End Transport Through Intermediary Nodes.
U.S. Appl. No. 60/620,889, filed Oct. 20, 2004, Method and Apparatus for Communication Interception.
U.S. Appl. No. 13/423,112, filed Mar. 16, 2012, Method and Apparatus for Intercepting Events in a Communication System.
U.S. Appl. No. 60/620,961, filed Oct. 20, 2004, Method and Apparatus for Intercepting Events in a Communication System.
U.S. Appl. No. 13/096,239, filed Apr. 28, 2011, System and Method for Tracking Billing Events in a Mobile Wireless Network for a Network Operator.
U.S. Appl. No. 60/650,975, filed Feb. 9, 2005, E-Mail Messaging to/form a Mobile Terminal.
U.S. Appl. No. 60/651,082, filed Feb. 9, 2005, Data Security in a Mobile E-Mail Service.
U.S. Appl. No. 12/205,747, filed Sep. 5, 2008, Maintaining Mobile Terminal Information for Secure E-Mail Communications.
U.S. Appl. No. 12/228,325, filed Aug. 11, 2008, Messaging Centre for Forwarding E-Mail.
U.S. Appl. No. 60/651,081, filed Feb. 9, 2005, Provisioning of E-Mail Settings for a Mobile Terminal.
U.S. Appl. No. 13/349,200, filed Jan. 12, 2012, Provisioning of E-Mail Settings for a Mobile Terminal.
U.S. Appl. No. 60/661,757, filed Mar. 14, 2005, Agnostic User Interface for Use in Mobile Device.
U.S. Appl. No. 12/970,452, filed Dec. 16, 2010, Intelligent Rendering of Information in a Limited Display Enviroment.
U.S. Appl. No. 13/474,508, filed May 17, 2012, System and Method for Executing Commands That Are Non-Native to The Native Enviroment of a Mobile Device.
U.S. Appl. No. 60/704,781, filed Aug. 1, 2005, Networked Personal Information Management.
U.S. Appl. No. 11/362,488, filed Feb. 24, 2006, Context Aware Data Presentation.
U.S. Appl. No. 11/925,959, filed Oct. 28, 2007, Data Aggregation and Access.
U.S. Appl. No. 11/925,988, filed Oct. 28, 2007, Sharing of Data Utilizing Push Functionality and Privacy Settings.
U.S. Appl. No. 11/925,992, filed Oct. 28, 2007, Extending User Relationships.
U.S. Appl. No. 11/303,048, filed Dec. 14, 2005, Publishing Data in an Information Community.
U.S. Appl. No. 13/030,023, filed Feb. 17, 2011, Targeted Notification of Content Availability to a Mobile Device.
U.S. Appl. No. 60/805,301, filed Jun. 20, 2006, Communication and Content Sharing Access Social Networks.
U.S. Appl. No. 12/848,858, filed Aug. 2, 2010, Location-Based Operations and Messaging.
U.S. Appl. No. 11/701,590, filed Feb. 2, 2007, System and Methods for Group Messaging.
U.S. Appl. No. 11/729,314, field Mar. 27, 2007, System and Method for Group Management.
U.S. Appl. No. 60/941,632, filed Jun. 1, 2007, Polling.
U.S. Appl. No. 12/080,247, filed Mar. 31, 2008, Polling.
U.S. Appl. No. 60/062,797, filed Jan. 28, 2008, System and Methods for Data Transport.
U.S. Appl. No. 12/080,216, filed Mar. 31, 2008, Reducing Network and Battery Consumption During Content Delivery to a Mobile Device.
U.S. Appl. No. 13/489,855, Jun. 6, 2012, Reducing Network and Battery Consumption During Content Delivery and Playback.
U.S. Appl. No. 12/361,538, filed Jan. 28, 2009, System and Method for Data Transport.
U.S. Appl. No. 13/158,706, filed Jun. 13, 2011, System and Method for Facilitating Mobile Traffic in a Mobile Network.
U.S. Appl. No. 12/361,434, filed Jan. 28, 2009, Web-Based Access to Data Objects.
U.S. Appl. No. 13/086,207, filed Apr. 13, 2011, System and Method of a Relay Server for Managing Communications and Notification Between a Mobile Device and Application Server.
U.S. Appl. No. 12/361,520, filed Jan. 28, 2009, Intergrated Messaging.
U.S. Appl. No. 13/083,278, Apr. 8, 2011, Integrated Messaging.
U.S. Appl. No. 61/104,674, filed Oct. 10, 2008, Bandwidth Measurement.
U.S. Appl. No. 12/577,213, filed Oct. 12, 2009, Bandwidth Measurement.
U.S. Appl. No. 11/640,629, filed Dec. 18, 2006, Flexible Real-Time Access.
U.S. Appl. No. 12/001,288, filed Dec. 10, 2007, Electronic-Mail Filtering for Mobile Devices.
U.S. Appl. No. 12/002,300, filed Dec. 13, 2007, Content Delivery to a Mobile Device from a Content Service.
U.S. Appl. No. 13/208,200, filed Aug. 11, 2011, Providing a Network Service in a Distributed Fashion to a Mobile.
U.S. Appl. No. 13/208,185, filed Aug. 11, 2011, Mobile Virtual Network Operator.
U.S. Appl. No. 13/427,748, filed Mar. 22, 2012, System and Method for Providing a Network Service in a Distributed Fashion to a Mobile Device.
U.S. Appl. No. 12/011,396, filed Jan. 25, 2008, Policy Based Content Service.
U.S. Appl. No. 13/168,067, filed Jun. 24, 2011, System for Providing Policy Based Content Serivce in a Mobile Network.
U.S. Appl. No. 12/080,142, filed Mar. 31, 2008, Content Search Engine.
U.S. Appl. No. 12/141,871, filed Jun. 18, 2008, Application Discovery on Mobile Devices
U.S. Appl. No. 13/312,664, filed Dec. 6, 2011, Provisioning Application for a Mobile Device.
U.S. Appl. No. 12/348,136, field Jan. 2, 2009, Predictive Content Delivery.
U.S. Appl. No. 61/367,871, filed Jul. 26, 2010, Conserving Power Consumption in Applications with Network Initiated Data Transfer.
U.S. Appl. No. 13/178,598, filed Jul. 8, 2011, Context Aware Traffic Management for Resource Conservation in a Wireless Network.
U.S. Appl. No. 13/407,406, filed Feb. 28, 2012, System and Method for Conserving Battery Consumption on a Mobile Device.
U.S. Appl. No. 13/477,625, May 22, 2012, Mobile Device Radio Use Optimization by Batching Low Priority Requests.
U.S. Appl. No. 61/367,870, filed Jul. 26, 2010, Managing and Improving Network Resource Utilization, Performance and Optimizing Traffic in Wire Line and Wireless Network with Mobile Clients.
U.S. Appl. No. 13/188,553, filed Jul. 22, 2011, Mobile Application Traffic Optimization.
U.S. Appl. No. 13/351,176, filed Jan. 16, 2012, Mobile Application Traffic Optimization.
U.S. Appl. No. 61/408,858, filed Nov. 1, 2010, Cross Application Traffic Coordination.
U.S. Appl. No. 13/115,631, filed May 25, 2011, Mobile Network Traffic Coordination Across Multiple Applications.
U.S. Appl. No. 13/355,443, filed Jan. 20, 2012, Mobile Network Traffic Coordination Across Multiple Applications.

(56) References Cited

OTHER PUBLICATIONS

U.S. Appl. No. 61/408,839, filed Nov. 1, 2010, Activity Session As Method of Optimizing Network Resource Use.
U.S. Appl. No. 13/115,740, filed May 25, 2011, Prediction of Activity Session for Mobile Network Use Optimization and User Experience Enhancement.
U.S. Appl. No. 61/408,829, filed Nov. 1, 2010, Distributed Policy Management.
U.S. Appl. No. 13/178,675, filed Jul. 8, 2011, Distributed Implementation of Dynamic Wireless Traffic Policy.
U.S. Appl. No. 61/408,846, filed Nov. 1, 2010, Intelligent Cache Management in Congested Wireless Networks.
U.S. Appl. No. 13/176,537, filed Jul. 5, 2011, Distributed Caching for Research and Mobile Network Traffic Management.
U.S. Appl. No. 61/408,854, filed Nov. 1, 2010, Intelligent Management of Non-Cachable Content in Wireless Networks.
U.S. Appl. No. 61/532,857, filed Sep. 9, 2011, Cache Defeat Detection and Caching of Content Addressed by Identifiers Intended to Defeat Cache.
U.S. Appl. No. 13/474,561, filed May 17, 2012, Cache Defeat Detection and Caching of Content Addressed by Identifiers Intended to Defeat Cache.
U.S. Appl. No. 61/408,826, filed Nov. 1, 2010, One Way Intelligent Heartbeat.
U.S. Appl. No. 13/287,046, 13/287,046, Distributed Management of Keep-Alive Message Signaling for Mobile Network Resource Conservation and Optimization.
U.S. Appl. No. 61/408,820, filed Nov. 1, 2010, Traffic Categorization and Policy Driving Radio State.
U.S. Appl. No. 13/287,058, filed Nov. 1, 2011, Mobile Traffic Categorization and Policy for Network Use Optimization While Preserving User Experience.
U.S. Appl. No. 61/416, 020, filed Nov. 22, 2010, Aligning Bursts from Server to Client.
U.S. Appl. No. 13/300,267, filed Nov. 18, 2011, Aligning Data Transfer to Optimize Connections Established for Transmission Over a Wireless Network.
U.S. Appl. No. 13/407,582, filed Feb. 28, 2012, Mobile Network Background Traffic Data Management With Optimized Polling Intervals.
U.S. Appl. No. 61/416,033, filed Nov. 22, 2010, Polling Interval Functions.
U.S. Appl. No. 13/301,864, filed Nov. 22, 2011, Optimization of Resource Polling Intervals to Satisfy Mobile Device Requests.
U.S. Appl. No. 61/430,828, filed Jan. 7, 2011, Domain Name System With Network Traffic Harmonization.
U.S. Appl. No. 13/346,627, filed Jan. 9, 2012, System and Method for Reduction of Mobile Network Traffic Used for Domain Name System (DNS) Queries.
U.S. Appl. No. 61/476,976, filed Apr. 19, 2011, Virtual Memory, Shared Memory Management and Social Caching Based on Geo-Location in a Networked Environment.
U.S. Appl. No. 13/451,327, filed Apr. 19, 2012, Shared Resource and Virtual Resource Management in a Networked Environment.
U.S. Appl. No. 13/451,340, filed Apr. 19, 2012, Social Caching for Device Resource Sharing and Management.
U.S. Appl. No. 13/451,361, filed Apr. 19, 2012, Device Resources Sharing for Network Resource Conservation.
U.S. Appl. No. 61/479,676, filed Apr. 27, 2011, Atomic Process for Offloading Mobile Application Activity by Traffic Snooping.
U.S. Appl. No. 13/457,335, filed Apr. 26, 2012, Mobile Device Which Offloads Requests Made by a Mobile Application to a Remote Entity for Conservation of Mobile Device and Network Resources and Methods Therefor.
U.S. Appl. No. 13/457,368, filed Apr. 26, 2012, System and Method for Making Requests on Behalf of a Mobile Device Based on Atomic Processes for Mobile Traffic Relief.
U.S. Appl. No. 61/479,722, filed Apr. 27, 2011, Detecting and Preserving State for Satisfying Application Requests in a Distributed Proxy and Cache System.
U.S. Appl. No. 13/458,797, filed Apr. 27, 2012, Detecting and Preserving State for Satisfying Application Requests in a Distributed Proxy and Cache System.
U.S. Appl. No. 61/479,701, filed Apr. 27, 2011, Detection and Filtering of Malware Based on Traffic Observations Made in a Distributed Mobile Traffic Management System.
U.S. Appl. No. 13/458,844, filed Apr. 27, 2012, Detection and Filtering of Malware Based on Traffic Observations Made in a Distributed Mobile Traffic Management System.
U.S. Appl. No. 13/274,265, filed Oct. 14, 2011, Caching Adapted for Mobile Application Behavior and Network Conditions.
U.S. Appl. No. 13/274,501, filed Oct. 17, 2011, Request and Response Characteristics Based Adaptation of Distributed Caching in a Mobile Network.
U.S. Appl. No. 61/512,278, filed Jul. 27, 2011, Heuristic Detection and Blocking of Malicious Applications in a Wireless Network Via a Distributed Proxy System.
U.S. Appl. No. 13/546,995, filed Jul. 11, 2012, Monitoring Mobile Application Activities for Malicious Traffic on a Mobile Device.
U.S. Appl. No. 13/547,001, filed Jul. 11, 2012, Automatic Generation and Distribution of Policy Information Regarding Malicious Mobile Traffic in a Wireless Network.
U.S. Appl. No. 61/533,007, filed Sep. 9, 2011, Distributed Caching in a Wireless Network of Content Delivered for a Mobile Application Over a Long-Held Request.
U.S. Appl. No. 13/274,250, filed Oct. 14, 2011, Distributed Caching in a Wireless Network of Content Delivered for a Mobile Application Over a Long-Held Request.
U.S. Appl. No. 61/533,021, filed Sep. 9, 2011, Application and Network-Based Long Poll Request Detection and Cacheability Assessment Therefor.
U.S. Appl. No. 13/412,338, filed Mar. 5, 2012, Application and Network-based Long Poll Request Detection and Cacheability Assessment Therefor.
U.S. Appl. No. 13/467,159, filed May. 9, 2012, filed Selective Data Compressions by a Distributed Traffic Management System to Reduce Mobile Data Traffic and Signaling Traffic.
U.S. Appl. No. 13/523,669, filed Jun. 14, 2012, Wireless Traffic Management System Cache Optimization Using HTTP Headers.
Newton, Harry, "Newton's Telecom Dictionary," 20th Edition, pp. 67, 127, 542, Mar. 2004.
Openet Telecom, "Taming Signaling: Addressing The Signaling Storm," Openet Labs Technical White Paper, 11 pages, 2012.
Parker, Tammy, "SK Telecom Aims to License, Standardize Smart Push," FierceBroadbandWireless, 4 pages, Aug. 26, 2012.
Paul, Sanjoy et al., "The Cache-And-Forward Network Architecture for Efficient Mobile Content Delivery Services in the Future Internet," First ITU-T Kaleidoscope Academic Conference for Innovation in NGN—Future Network and Services, 7 pages, May 12-13, 2008.
Zhang, Qi et al., "Cloud Computing: State-Of-The-Art and Research Challenges," J Internet Serv Appl, vol. 1, pp. 7-18, 2010.
Android Developers, "Date," 10 pages, Oct. 27, 2011.
Braden, R., "Requirements for Internet Hosts—Application and Support," RFC 1123, 80 pages, Oct. 1989.
"CR 3483 to Release 8 TS 25.331, Rev. 2," 3GPP TSG-RAN2 Meeting #64, Prague, Czech Republic, 11 pages, Nov. 10-14, 2008.
"CR 4100 to Release 8 TS 25.331, Rev. 1," 3GPP TSG-RAN WG2 Meeting #69, San Francisco, U.S., 6 pages, Feb. 22-26, 2010.
Elz, R. et al., "Clarifications to the DNS Specification," RFC 2181, 12 pages, Jul. 1997.
European Patent Application No. EP 05815115.0, Supplementary European Search Report, 7 pages, Nov. 17, 2011.
GSM Association, "Network Efficiency Task Force Fast Dormancy Best Practices," V1.0, 21 pages, May 26, 2010.
International Application No. PCT/US2005/038135, International Preliminary Report on Patentability, 9 pages, Oct. 31, 2011.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.

(56) References Cited

OTHER PUBLICATIONS

International Application No. PCT/US2011/043322, International Search Report, 9 pages, Feb. 9, 2012.
International Application No. PCT/US2011/043328, International Search Report, 12 pages, Feb. 27, 2012.
International Application No. PCT/US2011/043409, International Search Report, 11 pages, Feb. 9, 2012.
International Application No. PCT/US2011/044974, International Search Report, 15 pages, Jun. 1, 2012.
International Application No. PCT/US2011/056474, International Search Report, 9 pages, May 4, 2012.
International Application No. PCT/US2011/056476, International Search Report, 12 pages, May 24, 2012.
International Application No. PCT/US2011/056478, International Search Report, 11 pages, May 31, 2012.
International Application No. PCT/US2011/058840, International Search Report, 10 pages, Apr. 26, 2012.
International Application No. PCT/US2011/058843, International Search Report, 11 pages, May 16, 2012.
International Application No. PCT/US2011/058848, International Search Report, 10 pages, Apr. 10, 2012.
International Application No. PCT/US2011/061512, International Search Report, 10 pages, May 10, 2012.
International Application No. PCT/US2012/021459, International Search Report, 10 pages, Jun. 1, 2012.
International Application No. PCT/US2012/022121, International Search Report, 11 pages, May 14, 2012.
Mockapetris, P., "Domain Names—Concepts and Facilities," RFC 1034, 43 pages, Nov. 1987.
Mockapetris, P., "Domain Names—Implementation and Specification," RFC 1035, 43 pages, Nov. 1987.
Perez, Sarah, "Onavo's Data-Compressing Mobile App Raises $10 Million Series B From Horizons, Motorola Ventures," 2 pages, Jan. 24, 2012.
Qualcomm Incorporated, "Managing Background Data Traffic in Mobile Devices," 16 pages, Jan. 2012.
Qualcomm, "System Parameter Recommendations to Optimize PS Data User Experience and UE Battery Life," 80-W1112-1, Revision B, 9 pages, Mar. 2007.
Seven Networks, Inc., "Seven Optimizing the Mobile Ecosystem," www.seven.com/products.traffic_optimization.php, 1 page, May 29, 2012.
Wikipedia, Definition for "General Packet Radio Service," 7 pages, downloaded on May 31, 2012.

\* cited by examiner

POLLING

CROSS-REFERENCE TO RELATED APPLICATION

This application claims the priority benefit of U.S. Provisional Patent Application Ser. No. 60/941,632, filed on Jun. 1, 2007, entitled "Polling" which is hereby incorporated by reference.

BACKGROUND

1. Field of the Invention

The present invention generally relates to the field of wireless mobile device services. More specifically, the present invention relates to poll creation, poll publication, and poll processing.

2. Description of Related Art

Mobile devices may be used to communicate via text messages. The use of text messages may be used to conduct polls. An example of text based polling is the television show American Idol. Viewers of American Idol vote for the contestants they want to help avoid elimination. An available voting method is the use of text messages from a mobile device. Viewers send a text message with the word "vote" to a number associated with the particular contestant for whom the viewer wants to vote. These votes, along with votes received through other voting methodologies, are counted and used in determining the outcome of the show.

Mobile device polling is currently limited to polls setup by large entities such as American Idol in association with a network service provider (e.g., AT&T Wireless). The subject matter of the text message polls and the allowable responses are predetermined. There is a need in for individuals to create and conduct their own text message polls that is presently unavailable in the prior art.

SUMMARY

A method for mobile network polling is disclosed. The method includes receiving a poll created on an originating client at the polling server. The poll is then processed at the polling server. The poll is then published from the polling server to one or more mobile devices. The poll responses generated by users of the mobile devices are received at the polling server. The poll responses are processed at the polling server. The poll results are published from the polling server to the poll originator.

A system for polling in a mobile network includes a computing device, a polling server, and one or more mobile devices. The computing device generates a poll. The polling server is connected to the computing device. The polling server receives the generated poll. The polling server further validates the poll. The one or more mobile devices are communicatively connected to the polling server. The one or more mobile devices receive the poll as published by the polling server. The one or more mobile devices generate a response to the published poll. The polling server receives the generated response to the published poll. The polling server processes the generated response to the published poll. The polling server publishes the results to the one or more mobile devices that generated a response to the published poll.

A polling server including a poll validation module, a poll publication module, a poll response module, and a poll results publication module. The poll validation module receives a poll generated by a computing device connected to a polling server. The poll validation module verifies that the generated poll conforms to the requirements of the polling server. The poll validation module may alternatively verify that the generated poll conforms to the requirements of a polling application utilized by the polling server. The poll validation module may alternatively verify that the generated poll conforms to both the requirements of the polling server and the polling application utilized by the polling server. The poll publication module converts the generated poll into a format that may be transmitted over a network. The poll publication module may alternatively convert the generated poll into a format that may be executed and rendered by a polling application at a mobile device connected to a network. The poll publication module may alternatively convert the generated poll into a format that may both be transmitted over a network and be executed and rendered by a polling application at a mobile device connected to a network. The poll response module receives the responses to the published poll from the one or more mobile devices that generated a response to the published poll and calculates the results from the poll. The poll results publication module publishes the results of the poll that was calculated by the poll response module.

DETAILED DESCRIPTION

Figure 1:
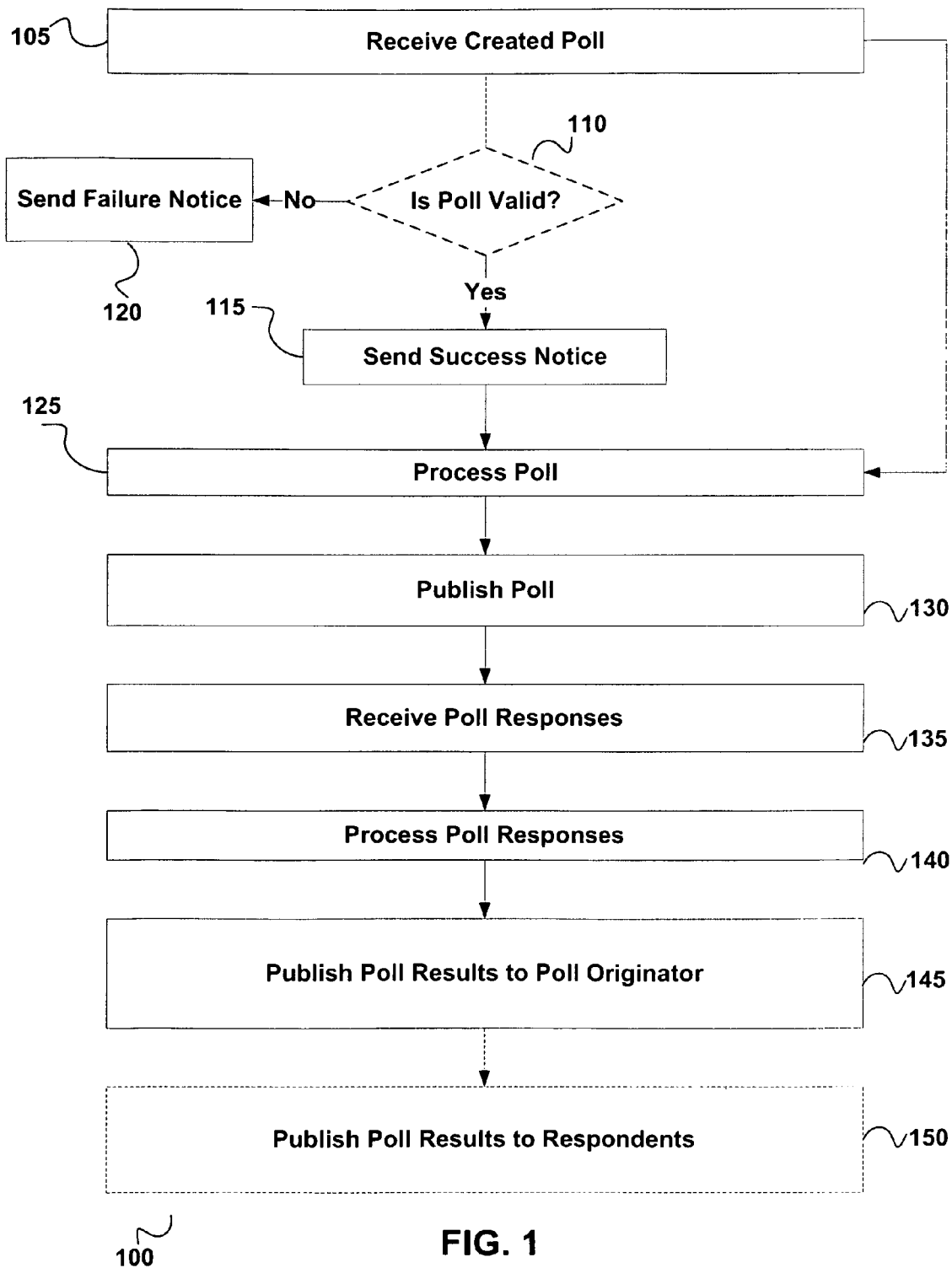
FIG. 1 depicts an exemplary method for polling in a mobile network.

FIG. 1 depicts a method for mobile network polling 100. In step 105, a poll created on an origination client is received at the polling server. Poll creation may be performed by the poll originator using poll creation software on a mobile device or personal computer (PC) or through a web-based application, which may be accessible on a PC or mobile device. The poll creation software may specify the mandatory and optional elements of the poll. Poll elements may include recipients, subject, poll question(s), poll question type(s) (i.e., multiple choice single answer, multiple choice instant runoff, etc), validity period, priority, free or premium participation, delay options, and privacy provisions.

An application programming interface (API) overlay may be provided on an SMS system during poll creation. A user may choose a poll creation option that may link the poll to a specific phone number or text message address. When a user subsequently responds to the poll, the mobile device may automatically dial and/or send the text message to submit the user's vote without the need for remembering an exact number or verbiage for texting.

In optional step 110, the poll is validated at the polling server. The polling server verifies that the generated poll conforms to the requirements of the polling server. The polling server may alternatively verify that the generated poll conforms to the requirements of a polling application utilized by the polling server. The polling server may alternatively verify that the generated poll conforms to both the requirements of the polling server and the polling application utilized by the polling server.

In step 115, a success notification is sent from the polling server to the originating client if the poll is valid. In step 120 a failure notification is sent from the polling server to the originating client if the poll is invalid. The user of the originating client may then modify the poll, re-create a new poll, or abandon the poll. Notices, in either instance, may be SMS based or an e-mail communication. Details as to why a poll is not valid may be included in the response.

In step 125 the poll is processed at the polling server. A poll object is created for each transport used to reach the poll recipients. Such transports may include Short Message Service (SMS) with reply-to-me shortcode, generic Instant Message (IM), network-specific poll API Instant Message (IM), Email with reply-to-me processing, Email with embedded HTML form, or Email/SMS/IM with a link to a web-based voting site. Poll processing also includes converting the generated poll into a format that may be transmitted over a network. The polling server may convert the generated poll into a format that may be executed and rendered by a polling application at a mobile device connected to a network. The polling server may convert the generated poll into a format that may both be transmitted over a network and be executed and rendered by a polling application at a mobile device connected to a network. The polling server may use either charging or accounting functions, or both, before or after processing the poll. The polling server may require the originating client to verify charges before processing the poll.

In step 130 the poll is published from the polling server to one or more mobile devices. The poll may be published to the one or more poll recipients via SMS with reply-to-me shortcode, generic IM, network-specific poll API IM, Email with reply-to-me processing, Email with embedded HTML form, or Email/SMS/IM with a link to an HTTP site.

In step 135 the poll responses are received as generated by users of the one or more mobile devices. The responses are gathered via one or more channels. The channels may include SMS shortcode, IM agent, Email agent, or an HTTP voting site.

In step 140 the poll responses are processed. The polling server receives the responses to the published poll from the one or more mobile devices that generated a response to the published poll and calculates the results from the poll. The answers for each poll question may be counted. The total number of responses received may be counted. Percentages may be calculated, such as the percentage of correct responses for each poll question, the percentage of each answer received for each poll question, the percentage of responses received from the poll recipients, or percentages of responses that are correct or incorrect.

In step 145 the results to the poll originator are published. The publishing of the results to the poll originator may occur synchronously or asynchronously. In a synchronous embodiment, there is an open Internet Protocol (IP) response to the originating client that generated the poll. Where the originating client is a personal computer or web-based application, a dynamic update form may be pushed to the originating client. In an asynchronous embodiment, there may be an IP push to the originating client after disconnect whereby a communication channel is opened (e.g., by an initial SMS message) followed by delivery of the relevant polling data results. The results may be published to the poll originator by sending an SMS summary to the originating client, updating an HTTP results page, or updating an XML/HTTP feed.

In optional step 150 is publishing the poll results to the one or more mobile device whose users provided a response to the published poll in step 135. Automated updates on poll results may be sent to the user's mobile phone or mobile device via, for example, an HTTP GET command. For example, once a user responds to a poll about racing by submitting a choice for favorite race car driver, the mobile device may automatically receive and display details regarding the current poll results as well as the final poll results once the poll is closed. The poll may also include an option for delaying a response. If a user chooses to respond to the poll later, the poll creation software on the mobile device may provide reminder messages and/or result updates up until the poll closes. The polling server may also provide reminder messages and/or result updates up until the poll closes.

The present polling method may be used to drive Internet traffic. Polling may use subscriptions to gauge previously established interests, which may be used to drive Internet traffic to related sites. For example, when a user participates in a poll, updates regarding the poll may include links to websites with related content or even automatic redirects to the same.

Figure 2:
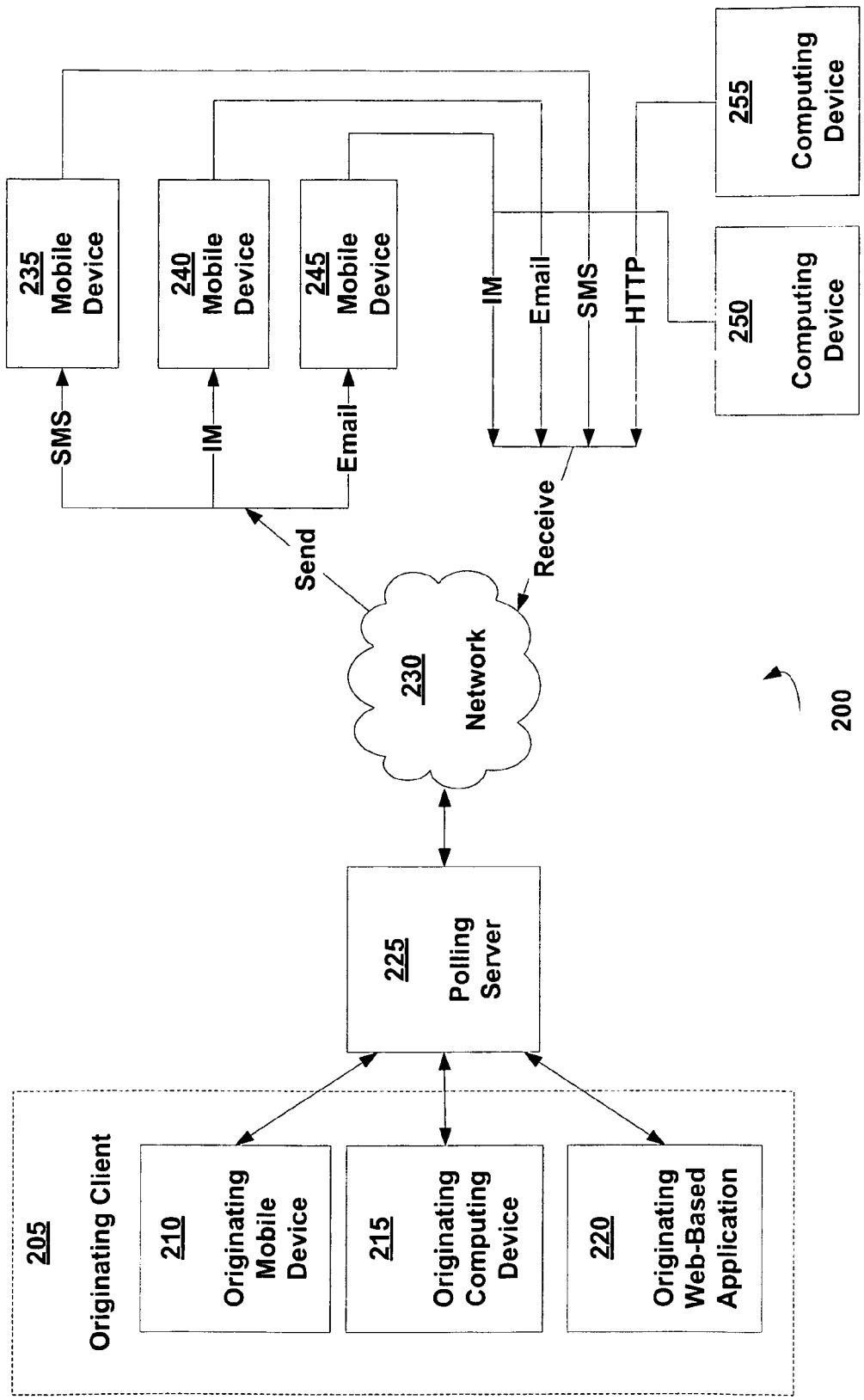
FIG. 2 depicts an exemplary system for polling in a mobile network.

FIG. 2 depicts an exemplary system 200 for polling in a mobile network. The poll may be created using an originating client 205. The originating client 205 may be an originating mobile device 210, an originating computing device 215, or an originating web-based application 220. The poll may be creating using poll creation software on the originating mobile device 210 or originating computing device 215 as well as through a web-based application 220, which may be used through a browser loaded on a mobile device or computer device.

Figure 3:
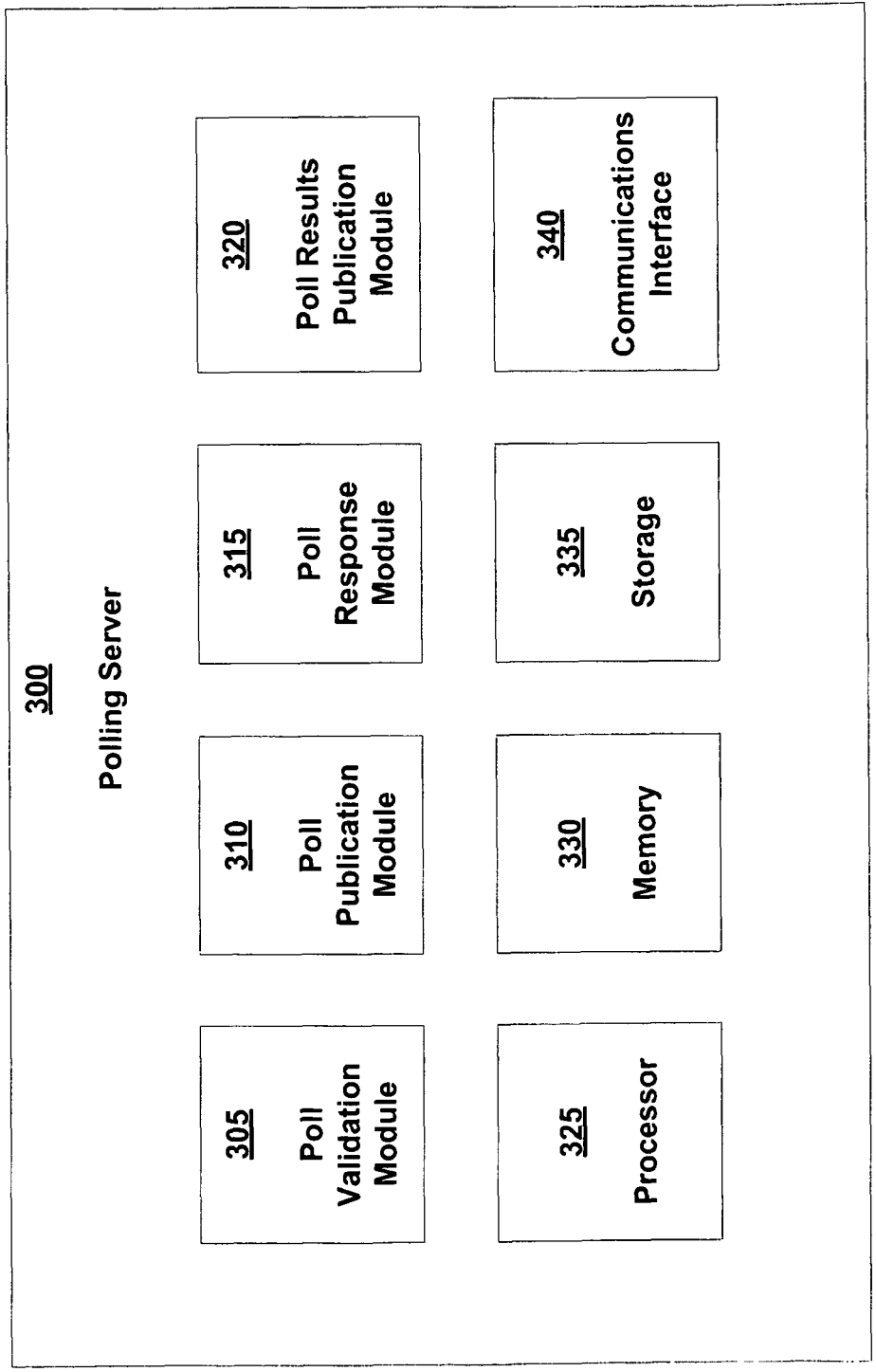
FIG. 3 depicts an exemplary polling server.

Once the poll is created, it is published to the polling server 225 (FIG. 3). In some embodiments, the originating client 205 may pre-validate the poll prior to publishing the poll to the polling server 225. The polling server 225 then validates the poll and returns a success or failure notification to the originating client 205. In some embodiments, the polling server 225 may use a charging function, or accounting function, or both either before or after processing the poll. The charging function or accounting function allows the polling server to charge the poll originator a fee. Types of fees may include flat fees or fees based on poll options, poll complexity, number or poll questions, and number of poll recipients. The polling server 225 may require the client verify charges before processing the poll.

The polling server 225 then processes the poll. The polling server 225 creates a poll object for each type of transport to be used to reach poll recipients. The types of poll objects that may be created include an SMS with reply-to-me shortcode, generic IM, network-specific poll API IM, Email with reply-to-me processing, Email with an embedded HTML form, or an SMS, IM or Email embedded with a link to an HTTP voting site. The polling server then publishes the poll to one or more mobile devices 210 using the poll objects. The polling server 225 and the one or more mobile devices 210 are connected over a network 230.

The users of the one or more mobile devices 210 receive the poll and may then respond to the poll. The users of the one or more mobile devices may then respond to the poll via the mobile device, or through a computing device 215 using SMS, IM, Email, or an HTTP voting site. The system may contain one or more computing devices 215 through which other mobile device users may use to respond to the poll. The user of the mobile device does not have to respond to the poll via the method in which they received the poll. For example, if the poll is published to one of the mobile devices 210 via SMS, the user of that mobile device 210 may not be limited to responding to the poll via SMS. The user of that mobile device 210 may choose to any available response modes made available by the poll originator, which may include SMS, IM, Email, or an HTTP voting site.

The poll responses are sent back to the polling server 225. The polling server then processes the poll results. The polling server may count the answers for each poll question, or the total number of responses received. The polling server may calculate percentages of each answer submitted for each poll question, percentages of correct responses for each poll question, percentage of responses received from the poll recipients, or percentages of responses that are correct or incorrect. The poll results are then published to the originating client 205. The results may also be published to the poll recipients or poll responders. The poll results may be published in real time, time delay, set time interval, at predetermined change points, or after the poll has closed.

FIG. 3 depicts an exemplary polling server 300. Polling server 300 may include various hardware and software in order to allow for communication over a network and as otherwise known in the art. These components may include a processor 325, memory 330, storage 335, and a communication interface 340. Processor 325 may be utilized to execute the various software modules described herein. Memory 330 and storage 335 may be utilized for the short term and/or long term storage of information related to processing of polling data and subsequent storage of the same. Communication interface 340 may allow for communication and exchange of various data types over a network.

Polling server 300 may include a poll validation module 305, a poll publication module 310, a poll response module 315, and a poll results publication module 320. Modules 305, 310, 315, and 320 may be executed by processor 325 (which may be a general purpose processor), an application specific integrated circuit (ASIC) embedded with microcode corresponding to microcode functionality, or other known processing element.

The poll validation module 305 (when executed by processor 325) processes a received poll generated by a computing device in communication with polling server 300. The poll validation module 305 verifies that the generated poll conforms to the requirements of the polling server 300. The poll validation module 305 may alternatively verify that the generated poll conforms to the requirements of a polling application utilized by the polling server 300. The poll validation module 305 may also verify that the generated poll conforms to both the requirements of the polling server and the polling application utilized by the polling server.

Execution of the poll publication module 310 converts the generated poll into a format that may be transmitted over a network. The poll publication module 310 may also convert the generated poll into a format that may be executed and rendered by a polling application at a mobile device connected to a network. The poll publication module 310 may also convert the generated poll into a format that may both be transmitted over a network and be executed and rendered by a polling application at a mobile device in communication with a network.

Execution of the poll response module 315 processes received responses to the published poll from the one or more mobile devices that generated a response to the published poll and calculates the results from the poll. The poll response module 315 may count the answers for each poll question, or the total number of responses received. The poll response module 315 may calculate percentages of each answer submitted for each poll question, percentages of correct responses for each poll question, percentage of responses received from the poll recipients, or percentages of responses that are correct or incorrect. The poll results publication module 320 provides for the publication of the results of the poll that was calculated by the poll response module 315.

While the present invention has been described in connection with a series of preferred embodiments, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method of conducting polls via mobile devices, the method, comprising:
   receiving, at a polling server, a poll which includes user-generated content on an originating client by an originating user,
   generating an Short Message Service (SMS) message including the poll and sending the poll from the polling server to mobile devices in the SMS message;
   wherein the poll was created and pre-validated at the originating client using an application installed on the originating client for poll creation to verify that the created poll conforms to requirements of the polling server;
   receiving, at the polling server, poll responses including user-generated responses of responding users of the mobile devices;
   processing the poll responses at the polling server; and
   publishing the poll results in real-time, from the polling server to one or more of the mobile devices;
   wherein, users of the one or more mobile devices provided a response to the poll;
   automatically sending updated poll results for publishing from the polling server to the one or more of the mobile devices until the closing of the poll.

2. The method of claim 1, wherein the originating client is a mobile device.

3. The method of claim 1, wherein, the poll is created by the user to be linked to a phone number for use by the responding users to submit the poll responses.

4. The method of claim 1, wherein, the poll created by the user is linked to a text message address for use by the responding users to send a text message to submit the poll responses.

5. The method of claim 1, further comprising validating the poll at the polling server to determine that the poll meets the requirements of the polling server prior to generating the SMS message including the poll.

6. The method of claim 1, further comprising applying a charging function before or after processing the poll to charge the originating user a fee for the poll.

7. The method of claim 1, further comprising creating a poll object from the poll to be sent to responding users for response, wherein, the poll object includes a link to a web-based voting site.

8. The method of claim 1, further comprising creating a poll object from the poll to be sent to responding users for response, wherein, the poll object includes the SMS message.

9. The method of claim 1, further comprising creating a poll object from the poll to be sent to responding users for response, wherein, the poll object is executable and rendered by an application at the mobile devices receiving the poll object.

10. The method of claim 1, further comprising requiring the originating user to verify charges before processing the poll.

11. The method of claim 1, wherein the polling server includes the creation of further comprising creating poll objects for each transport to be used to reach poll recipients, the poll objects selected from one or more of, generic IM, IM with a network-specific poll API, IM with a link to an HTTP voting site, Email with reply-to-me processing, Email with an embedded HTML form.

12. The method of claim 1, wherein the created poll comprises poll elements including one or more of recipients, subject, one or more poll questions, poll question type, validity period, priority, free or premium participation, delay options, and privacy provisions.

13. The method of claim 1, wherein the response to the poll is sent via one or more of, SMS shortcode, an IM agent, an Email agent, or an HTTP voting site.

14. The method of claim 1, wherein publishing the poll results from the polling server occurs synchronously to the originating client.

15. The method of claim 1, wherein publishing the poll results to the originating client occurs by pushing a dynamic form update.

16. The method of claim 1, wherein publishing the poll results to the originating client occurs asynchronously via an IP push.

17. The method of claim 2, wherein publishing the poll results to the originating client occurs asynchronously by sending an SMS summary.

18. The method of claim 1, wherein publishing the poll results to the originating client occurs asynchronously by updating an HTTP results page.

19. The method of claim 1, wherein publishing the poll results to the originating client occurs asynchronously by updating an XML/HTTP feed.

20. A system for polling in a mobile network, the system comprising:
    an originating mobile device; wherein, a user uses the originating mobile device to create a poll comprising various mandatory and optional poll elements;
    wherein the poll was created and pre-validated at the originating mobile device using an application installed on the originating mobile device for poll creation to verify that the created poll conforms to requirements of the polling server, and
    wherein the poll was created specifying an optional poll element indicating an instant runoff;
    a polling server coupled to the originating mobile device in the mobile network, the polling server configured to:
    receive the poll,
    validate the poll to verify that the poll meets the requirements of the polling server,
    process the poll to generate one or more poll objects for transport according to one or more transport methods specified by the user,
    apply a charging function in processing the poll, wherein the charging function applies a fee based on one or more attributes of the poll;
    send a success or failure notification to the originating mobile device;
    generate an Short Message Service (SMS) message including the poll;
    a receiving mobile device communicatively coupled to the polling server, the receiving mobile device configured to receive the poll in the SMS message as sent by the polling server and configured to generate a response to the published poll, and wherein the polling server is further configured to:
    receive the response to the poll,
    process the response to the poll to generate results,
    automatically send reminders for poll results to the receiving mobile device until the response to the published poll is received from the receiving mobile device or until closing of the poll;
    publish the results of the poll to the originating mobile device and the receiving mobile device communicatively coupled to the polling server.

21. The system of claim 20, wherein the polling server is configured to send a failure notification to the originating mobile device if the poll is invalid.

22. The system of claim 20, wherein, the poll is linked to a phone number or text message address such that the receiving mobile device of the responding users automatically dial or send a text message to submit the one or more poll responses.

23. The system of claim 21, wherein the originating mobile device is configured to receive input from a user modifying or re-creating a poll for submission when the failure notification is received at the originating mobile device.

24. The system of claim 20, wherein the polling server is further configured to send updates to the poll results to the originating mobile device and the receiving mobile device until the close of the poll.

25. The system of claim 20, wherein the polling server is configured to send a poll in one or more of, a generic IM, an IM with a network-specific poll API, and IM with a link to an HTTP voting site.

26. The system of claim 20, wherein the polling server is configured to send a poll in one or more of, an email, an Email with reply-to-me processing, an Email with an embedded HTML form, and an Email with a link to a voting site.

27. The system of claim 20, wherein the one or more attributes of the poll based on which the charging function applies the fee includes at least one of a number of recipients of the poll and a number of questions in the poll.

28. The system of claim 20, wherein the polling server is configured to send the poll in a link to an HTTP voting site.

29. The system of claim 20, wherein the polling server is configured to verify charges before processing the poll.

30. The system of claim 20, wherein the polling server is configured to send the poll in one or more of, SMS with reply-to-me shortcode, SMS with a link to an HTTP voting site.

31. The system of claim 20, wherein poll elements for the poll includes one or more of, recipients, subject, one or more poll questions, poll question type, validity period, priority, free or premium participation, delay options, and privacy provisions.

32. The system of claim 20, wherein the polling server is further configured to receive the response sent via SMS.

33. The system of claim 20, wherein the polling server is further configured to receive the response sent via IM or email.

34. The system of claim 20, wherein the polling server is further configured to receive the response sent via an HTTP voting site.

35. A system for polling via mobile devices, the system, comprising:
    means for, providing an application to a user to create and pre-validate an electronic poll at a mobile device;
    wherein the electronic poll is created at the mobile device using the application installed on the mobile device for poll creation;
    means for, receiving, the electronic poll created by the user;
    means for validating the electronic poll to verify that the electronic poll meets the requirements of a polling server;
    means for, applying a charging function in processing the electronic poll, wherein the charging function applies a fee based on one or more attributes of the poll;
    wherein, the electronic poll is created to be linked to a phone number or text message address where a poll response is automatically sent;

means for, sending a failure notification to the user in response to determining that the electronic poll is invalid;
means for, generating an Short Message Service (SMS) message including the electronic poll;
means for, sending the electronic poll to recipients in the SMS message for voting;
means for, receiving poll responses as generated by the recipients;
means for, publishing poll results to the user and recipients who voted on the electronic poll;
means for sending updated poll results to the user and the recipients until the closing of the poll.

36. The method of claim 1, wherein the poll was further pre-validated at the originating client using the application installed on the originating client for poll creation to verify that the created poll conforms to requirements of a polling application used by the polling server.

* * * * *